United States Patent
Prager et al.

(10) Patent No.: US 10,974,831 B2
(45) Date of Patent: Apr. 13, 2021

(54) ACTIVE POSITION CONTROL OF TETHERED HOOK

(71) Applicant: Wing Aviation LLC, Mountain View, CA (US)

(72) Inventors: Andre Prager, Sunnyvale, CA (US); Trevor Shannon, Mountain View, CA (US); Adam Woodworth, San Jose, CA (US)

(73) Assignee: Wing Aviation LLC, Mountain View, CA (US)

( * ) Notice: Subject to any disclaimer, the term of this patent is extended or adjusted under 35 U.S.C. 154(b) by 0 days.

(21) Appl. No.: 15/930,107

(22) Filed: May 12, 2020

(65) Prior Publication Data

US 2020/0277058 A1 Sep. 3, 2020

Related U.S. Application Data

(63) Continuation of application No. 15/851,654, filed on Dec. 21, 2017, now Pat. No. 10,689,113.

(51) Int. Cl.
*B64D 1/22* (2006.01)
*G05D 1/00* (2006.01)
(Continued)

(52) U.S. Cl.
CPC ............... *B64D 1/22* (2013.01); *B64C 39/02* (2013.01); *B64C 39/024* (2013.01); *B66C 1/425* (2013.01);
(Continued)

(58) Field of Classification Search
CPC .......... B64D 1/22; G05D 1/0094; B66D 1/12; B64C 39/02; B64C 39/024;
(Continued)

(56) References Cited

U.S. PATENT DOCUMENTS

| 3,113,751 A | 12/1963 | Cotton |
| 3,128,068 A | 4/1964 | Pauli |

(Continued)

FOREIGN PATENT DOCUMENTS

| JP | 10114489 A | 5/1998 |
| JP | 3383283 B2 | 3/2003 |
| WO | 2008/018912 | 2/2008 |

OTHER PUBLICATIONS

Melanson, Donald, "Robotic Yale Aerial Manipulator grabs a can of Guinness," Engadget, Published Aug. 30, 2010, Retrieved Nov. 26, 2017, https://www.engadget.com/2010/08/30/robotic-yale-aerial-manipulator-grabs-a-can-of-guinness/, 3 pages.

(Continued)

*Primary Examiner* — Peter D Nolan
*Assistant Examiner* — Ashley L Redhead, Jr.
(74) *Attorney, Agent, or Firm* — McDonnell Boehnen Hulbert & Berghoff LLP

(57) ABSTRACT

An example system includes an aerial vehicle, a sensor, and a winch system. The winch system includes a tether disposed on a spool, a motor operable to apply a torque to the tether, and a payload coupling apparatus coupled to the tether and configured to mechanically couple to a payload. The system also includes a repositioning apparatus configured to reposition the payload coupling apparatus in at least a horizontal direction. A control system is configured to control the aerial vehicle to deploy the payload coupling apparatus by unwinding the tether from the spool; receive, while the aerial vehicle hovers above the payload and from the sensor, data indicative of a position of the payload coupling apparatus in relation to the payload; and reposition, using the repositioning apparatus and based on the data, the payload coupling apparatus in the horizontal direction to mechanically couple to the payload.

20 Claims, 18 Drawing Sheets

(51) Int. Cl.
*B64C 39/02* (2006.01)
*B66C 1/42* (2006.01)
*B66D 1/12* (2006.01)

(52) U.S. Cl.
CPC ............. *B66D 1/12* (2013.01); *G05D 1/0094* (2013.01); *B64C 2201/128* (2013.01); *B64C 2201/141* (2013.01); *B64C 2201/146* (2013.01)

(58) Field of Classification Search
CPC ........ B64C 2201/141; B64C 2201/146; B64C 2201/128; B66C 1/425
See application file for complete search history.

(56) References Cited

U.S. PATENT DOCUMENTS

| | | | |
|---|---|---|---|
| 3,612,448 | A | 10/1971 | Frieder |
| 3,904,156 | A | 9/1975 | Smith |
| 4,396,945 | A | 8/1983 | DiMatteo et al. |
| 4,881,601 | A | 11/1989 | Smith |
| 5,292,165 | A | 3/1994 | Wiklund |
| 5,788,186 | A | 8/1998 | White |
| 6,086,015 | A | 7/2000 | MacCready, Jr. |
| 6,334,537 | B1 | 1/2002 | Tepper |
| 7,762,194 | B2 | 7/2010 | Gaigler |
| 8,162,263 | B2 | 4/2012 | Wong et al. |
| 8,251,307 | B2 | 8/2012 | Goossen |
| 8,643,850 | B1 | 2/2014 | Hartman et al. |
| 9,061,764 | B2 | 6/2015 | Riley et al. |
| 9,085,362 | B1 | 7/2015 | Kilian et al. |
| 9,174,733 | B1 | 11/2015 | Burgess et al. |
| 9,205,922 | B1 | 12/2015 | Bouwer |
| 9,302,770 | B2 | 4/2016 | Burgess et al. |
| 9,308,994 | B2 | 4/2016 | Uskert et al. |
| 9,346,547 | B2 | 5/2016 | Patrick et al. |
| 9,384,668 | B2 | 7/2016 | Raptopoulos et al. |
| 9,422,139 | B1 | 8/2016 | Bialkowski et al. |
| 9,469,410 | B2 | 10/2016 | Peake |
| 9,567,081 | B1 | 2/2017 | Beckman et al. |
| 9,573,684 | B2 | 2/2017 | Kimchi et al. |
| 9,580,173 | B1 | 2/2017 | Burgess et al. |
| 9,676,481 | B1 * | 6/2017 | Buchmueller ........... B64D 1/02 |
| 9,688,404 | B1 | 6/2017 | Buchmueller et al. |
| 9,725,168 | B2 | 8/2017 | Kim |
| 2004/0084567 | A1 | 5/2004 | Bailey |
| 2007/0200032 | A1 * | 8/2007 | Eadie .................... B66C 13/063 244/137.4 |
| 2009/0009596 | A1 | 1/2009 | Kerr et al. |
| 2011/0192932 | A1 | 8/2011 | Brenner et al. |
| 2011/0192938 | A1 | 8/2011 | DiMarzio et al. |
| 2012/0091261 | A1 | 4/2012 | Lee |
| 2012/0228432 | A1 | 9/2012 | Fox, Jr. |
| 2012/0303261 | A1 | 11/2012 | Bernhardt |
| 2013/0193269 | A1 | 8/2013 | Zwaan et al. |
| 2013/0054054 | A1 | 9/2013 | Tollenaere et al. |
| 2013/0238135 | A1 | 9/2013 | Fisher et al. |
| 2015/0076287 | A1 | 3/2015 | Dula |
| 2015/0158587 | A1 | 6/2015 | Patrick et al. |
| 2015/0239559 | A1 | 8/2015 | Uskert et al. |
| 2015/0317597 | A1 | 11/2015 | Shucker et al. |
| 2015/0331427 | A1 | 11/2015 | Chaudary |
| 2016/0059963 | A1 | 3/2016 | Burgess et al. |
| 2017/0073071 | A1 | 3/2017 | Salzmann et al. |
| 2017/0106978 | A1 | 4/2017 | Sopper et al. |
| 2017/0121023 | A1 | 5/2017 | High et al. |
| 2017/0197718 | A1 | 7/2017 | Buchmueller |
| 2017/0217571 | A1 | 8/2017 | Deng et al. |
| 2019/0114578 | A1 | 4/2019 | Afordakos |

OTHER PUBLICATIONS

Liszewski, Andrew, "Marine Robot Helicopters Can Now Snatch Cargo," Gizmodo, Published May 31, 2012, Retrieved Nov. 26, 2017, https://gizmodo.com/5914626/marine-robot-helicopters-can-now-snatch-cargo-without-landing, 2 pages.
Shannon et al., U.S. Appl. No. 15/389,338, filed Dec. 22, 2016, 175 pages.
Shannon et al., U.S. Appl. No. 15/389,138, filed Dec. 22, 2016, 170 pages.
Prager et al., U.S. Appl. No. 15/389,290, filed Dec. 22, 2016, 182 pages.
Prager et al., U.S. Appl. No. 15/389,304, filed Dec. 22, 2016, 172 pages.
Prager, Andre, U.S. Appl. No. 15/389,074, filed Dec. 22, 2016, 170 pages.
Shannon et al., U.S. Appl. No. 15/389,326, filed Dec. 22, 2016, 172 pages.
Shannon et al., U.S. Appl. No. 15/179,585, filed Jun. 10, 2016, 67 pages.
France-Presse, Agence, "Switzerland begins postal delivery by drone," The Guardian, Published Jul. 7, 2015, Retreieved Jan. 2, 2018, https://www.theguardian.com/technology/2015/jul/08/swiss-post-begins-testing-postal-delivery-by-unmanned-drone, 3 pages.
Hern, Alex, "DHL launches first commercial drone 'parcelcopter' delivery service," The Guardian, Published Sep. 25, 2014, Retrieved Jan. 2, 2108, https://www.theguardian.com/technology/2014/sep/25/german-dhl-launches-first-commercial-drone-delivery-service, 3 Pages.
Roberts et al., "Amazon dismayed by proposed FAA rules on commercial use of drones," The Guardian, Published Feb. 15, 2015, Retrieved Jan. 2, 2018, https://www.theguardian.com/world/2015/feb/15/amazon-faa-rules-commercial-use-drones, 3 Pages.
Thielman, Sam, "Congress warned that drones present 'a nightmare scenario for civil liberties'," The Guardian, Published Jun. 17, 2015, Retrieved Jan. 2, 2018, https://www.theguardian.com/technology/2015/jun/17/congress-drones-nightmare-scenario-for-civil-liberties, 4 pages.
Souppouris, Aaron, "Drone fitted with terrifying claw snatches objects at high speed," The Verge, Published Mar. 15, 2013, Retrieved Jan. 2, 2018, https://www.theverge.com/2013/3/15/4107484/drone-fitted-with-terrifying-claw-snatches-objects-at-high-speed, 2 pages.
Mogg, Trevor, "The 'Mantis Drone Claw' turns any quadcopter into a high-stakes arcade crane game," Published Dec. 6, 2015, Retrieved Jan. 2, 2018, https://www.digitaltrends.com/cool-tech/mantis-drone-claw-aims-bring-extra-fun-functionality-drone/, 2 pages.
International Searching Authority, International Search Report and Written Opinion dated Mar. 22, 2019, issued in connection with International Patent Application No. PCT/US2018/063223, filed on Nov. 30, 2018, 11 pages.
International Bureau, International Preliminary Report on Patentability dated Jul. 2, 2020, issued in connection with International Patent Application No. PCT/US2018/06223 filed on Nov. 30, 2018, 8 pages.

* cited by examiner

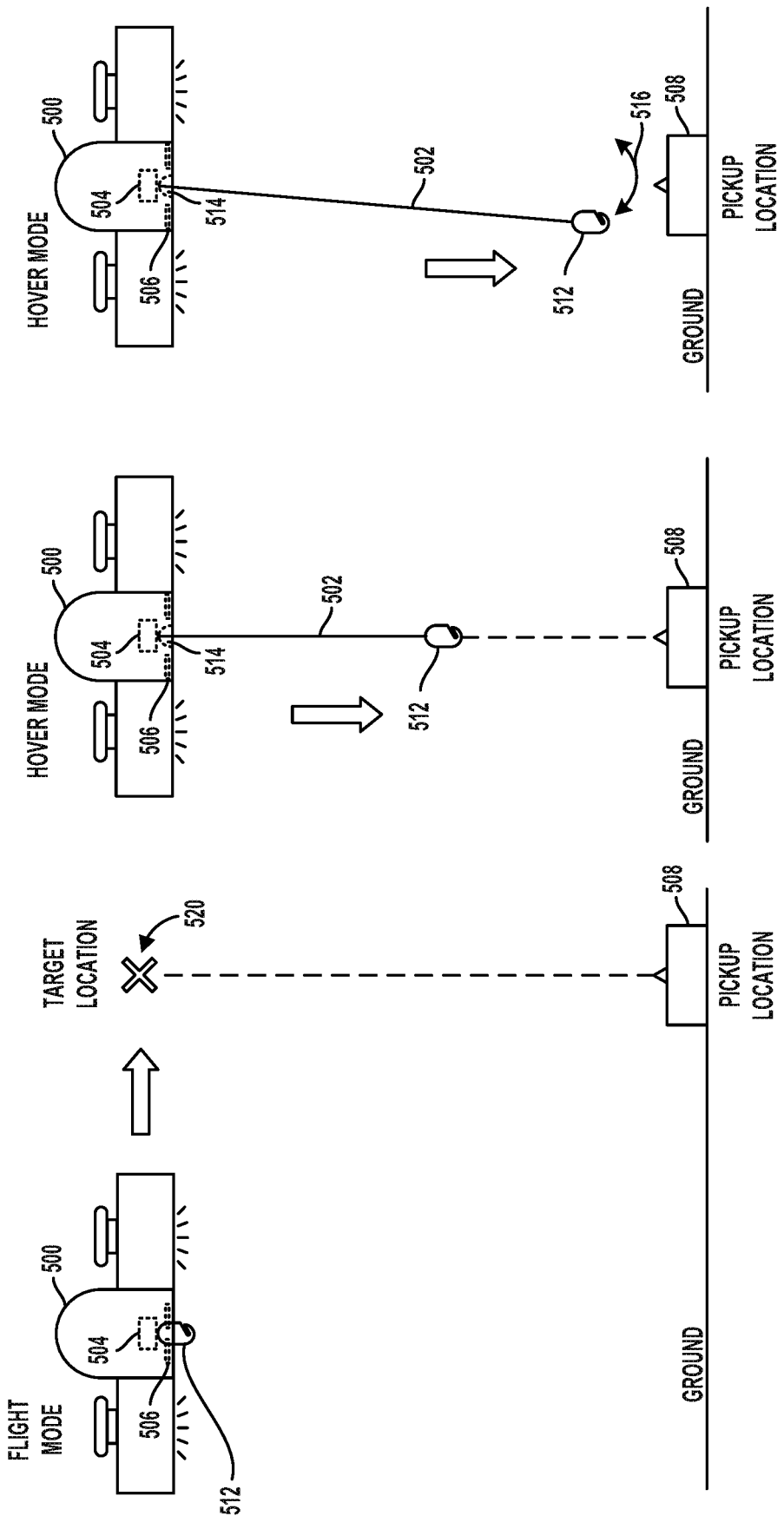

ACTIVE POSITION CONTROL OF TETHERED HOOK

CROSS-REFERENCE TO RELATED APPLICATION

This application is a continuation of and claims priority to U.S. patent application Ser. No. 15/851,654, filed Dec. 21, 2017, and entitled "Active Position Control of Tethered Hook," which is hereby incorporated by reference as if fully set forth in this description.

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so concurrently. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible. Furthermore, unmanned vehicles may require physical landing structure(s) to pick up or drop off payload, to charge batteries, or to complete other tasks.

SUMMARY

In an example embodiment, an unmanned aerial vehicle (UAV) may be configured to pick-up, transport, and drop-off payloads. The UAV may include a winch system having a tether disposed on a spool, driven by a motor, and configured to deploy a payload coupling apparatus coupled to the tether so as to engage a payload before pick-up or disengage the payload before drop-off. When picking up a payload, a control system of the UAV may, using one or more sensors coupled thereto, identify the payload within the environment and deploy the payload coupling apparatus by unwinding the tether from the spool. The UAV may be repositioned in coordination with the winch system so as to bring the payload coupling apparatus to within a threshold distance of the payload. The position of the UAV may then be fixed above the payload so as not to have movement of the UAV induce oscillations or other movements in the payload coupling apparatus hanging therebelow on the tether.

A repositioning device or apparatus may be used to reposition the payload coupling apparatus in at least a horizontal direction to mechanically couple the payload to the tether using the payload coupling apparatus. A distance between the repositioning device and the payload coupling apparatus may be smaller than a distance between the UAV and the payload coupling apparatus. Thus, the repositioning device may offer more direct control over the payload coupling apparatus, allowing the payload to be mechanically coupled to the tether faster, with fewer oscillations or unwanted movements of the payload coupling apparatus. The repositioning device may be controlled in coordination with the winch system to simultaneously control both the horizontal and vertical position of the payload coupling apparatus.

In a first embodiment, a system is provided that includes an aerial vehicle, a sensor coupled to the aerial vehicle, and a winch system coupled to the aerial vehicle. The winch system includes a tether disposed on a spool, a motor operable to apply a torque to the tether, and a payload coupling apparatus coupled to a leading end of the tether and configured to mechanically couple to a payload. The system also includes a repositioning apparatus configured to reposition the payload coupling apparatus in at least a horizontal direction and a control system. The control system is configured to identify the payload to be picked up by the aerial vehicle within an environment. The control system is also configured to control the aerial vehicle to hover above the payload. The control system is additionally configured to control the winch system to deploy the payload coupling apparatus by unwinding the tether from the spool. The control system is further configured to receive, while the aerial vehicle hovers above the payload and from the sensor, sensor data indicative of a position of the payload coupling apparatus in relation to the payload. The control system is yet further configured to, while the aerial vehicle hovers above the payload, reposition, using the repositioning apparatus and based on the sensor data, the payload coupling apparatus in the horizontal direction to mechanically couple to the payload.

In a second embodiment, a system is provided that involves identifying, by a control system, a payload to be picked up by an aerial vehicle within an environment. A winch system is coupled to the aerial vehicle. The winch system includes a tether disposed on a spool, a motor operable to apply a torque to the tether, and a payload coupling apparatus coupled to a leading end of the tether and configured to mechanically couple to the payload. The method also involves controlling, by the control system, the aerial vehicle to hover above the payload. The method additionally involves controlling, by the control system, the winch system to deploy the payload coupling apparatus by unwinding the tether from the spool. The method further involves receiving, by the control system, while the aerial vehicle hovers above the payload, from a sensor on the aerial vehicle, sensor data indicative of a position of the payload coupling apparatus in relation to the payload. The method yet further involves, while the aerial vehicle hovers above the payload, providing instructions by the control system to reposition, using a repositioning apparatus configured to reposition the payload coupling apparatus in at least a horizontal direction, based on the sensor data, the payload coupling apparatus in the horizontal direction to mechanically couple to the payload.

In a third embodiment, a non-transitory computer readable storage medium is provided having stored thereon instructions that, when executed by a computing device, cause the computing device to perform operations. The operations include identifying a payload to be picked up by an aerial vehicle within an environment. A winch system is coupled to the aerial vehicle. The winch system includes a tether disposed on a spool, a motor operable to apply a torque to the tether, and a payload coupling apparatus coupled to a leading end of the tether and configured to mechanically couple to the payload. The operations also include controlling the aerial vehicle to hover above the payload. The operations additionally include controlling the winch system to deploy the payload coupling apparatus by unwinding the tether from the spool. The operations further include receiving, while the aerial vehicle hovers above the payload, from a sensor on the aerial vehicle, sensor data indicative of a position of the payload coupling apparatus in relation to the payload. The operations yet further include, while the aerial vehicle hovers above the payload, providing instructions to reposition, using a repositioning apparatus configured to reposition the payload coupling apparatus in at least a horizontal direction, based on the sensor data, the payload coupling apparatus in the horizontal direction to mechanically couple to the payload.

In a fourth embodiment, a system is provided that includes an aerial vehicle, a sensor coupled to the aerial vehicle, and a winch system coupled to the aerial vehicle. The winch system includes a tether disposed on a spool, a motor operable to apply a torque to the tether, and a payload coupling apparatus coupled to a leading end of the tether and configured to mechanically couple to a payload. The system also includes a repositioning apparatus configured to reposition the payload coupling apparatus in at least a horizontal direction. The system additionally includes means for identifying the payload to be picked up by the aerial vehicle within an environment. The system yet additionally includes means for controlling the aerial vehicle to hover above the payload and means for controlling the winch system to deploy the payload coupling apparatus by unwinding the tether from the spool. The system further includes means for receiving, while the aerial vehicle hovers above the payload and from the sensor, sensor data indicative of a position of the payload coupling apparatus in relation to the payload. The system yet further includes means for, while the aerial vehicle hovers above the payload, reposition, using the repositioning apparatus and based on the sensor data, the payload coupling apparatus in the horizontal direction to mechanically couple to the payload.

These as well as other embodiments, aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIGS. 5A, 5B, 5C, 5D, 5E, and 5F illustrate a UAV picking up a payload from a pickup location, in accordance with example embodiments.

DETAILED DESCRIPTION

Figure 1A:
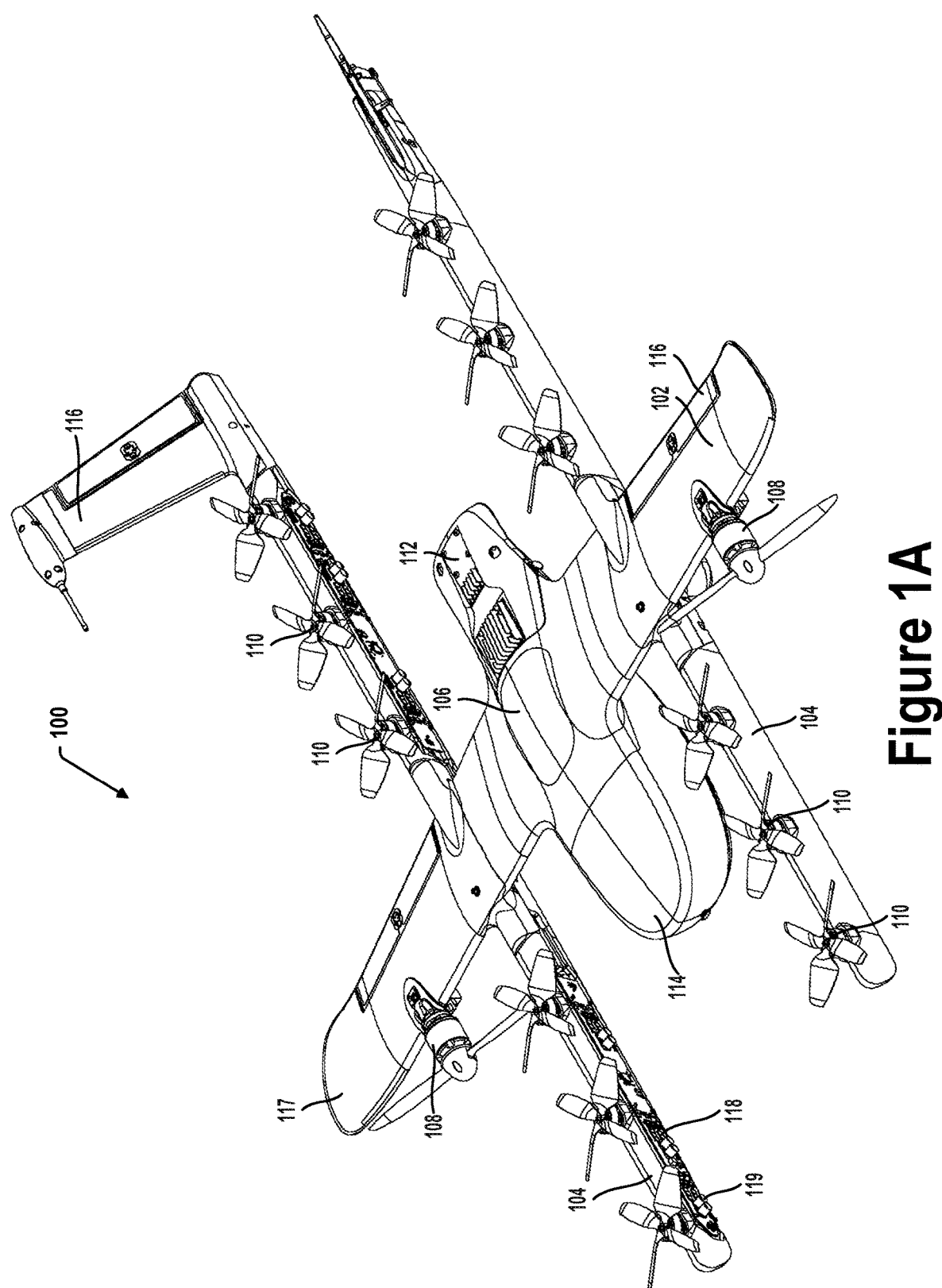
FIG. 1A is an illustration of an unmanned aerial vehicle, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless indicated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Throughout this description, the articles "a" or "an" are used to introduce elements of the example embodiments. Any reference to "a" or "an" refers to "at least one," and any reference to "the" refers to "the at least one," unless otherwise specified, or unless the context clearly dictates otherwise. The intent of using the conjunction "or" within a described list of at least two terms is to indicate any of the listed terms or any combination of the listed terms.

The use of ordinal numbers such as "first," "second," "third" and so on is to distinguish respective elements rather than to denote a particular order of those elements. For purpose of this description, the terms "multiple" and "a plurality of" refer to "two or more" or "more than one."

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment. In the figures, similar symbols typically identify similar components, unless context dictates otherwise. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. OVERVIEW

Disclosed herein are example implementations of devices and apparatuses for assisting a UAV in coupling a tethered hook to a payload to pick-up the payload, and for stabilizing or suppressing oscillations of the tethered hook and the payload during pickup or drop-off of the payload. A UAV, operating autonomously or semi autonomously, may be configured to pick-up, transport, and drop-off various payloads throughout a geographic area. The payloads may include or may be contained in packages, crates, bags, or other containers that protect the payload and provide an attachment point for engagement by the UAV. In order to avoid having to land on the ground or on the payloads to pick-up or drop-off the payloads, the UAV may use a tether wound around a motor-driven spool to lower a hook, clasp, grapnel, crook, claw, hasp, or other payload coupling apparatus to the ground to pick-up of drop-off the payload.

When picking up a payload without a human user on the ground to couple the hook to the payload, the UAV may have to steer the hook onto the attachment point on the payload. This may involve controlling a horizontal and a vertical position of the hook. The horizontal and vertical positions of the hook may be autonomously controlled by a control system of the UAV based on sensor data. The sensor data may be received from sensors coupled to the UAV. The sensors may be coupled to the UAV directly (e.g., connected to the UAV body), or indirectly (e.g., connected to the hook, which is tethered to the UAV), among other possibilities. The sensor data may include perception data, such as that from a depth camera or a light detection and ranging device, UAV height data, GPS data, magnetometer data, and orientation data, among other possibilities. The data may represent or may be used to determine a position of the payload, of the UAV relative to the payload, and of the hook relative to the payload, among other possibilities.

The vertical position of the hook may be controlled by adjusting a height at which the UAV hovers above the ground, as well as spooling and unspooling the tether. The vertical position of the hook may closely, without much delay, follow the vertical motion of the UAV and the spooling or unspooling of the tether.

The horizontal position of the hook may be adjustable by repositioning the UAV horizontally with respect to the payload. However, positioning the hook in this way may involve a delay between the horizontal motion of the UAV and corresponding motion of the hook. This delay may be caused by the UAV's motion having to be transferred to the hook along the tether, rather than being generated on or transferred to the hook directly (e.g., through a rigid connection). Additionally, the extent to which motion of the UAV is transferred to the hook may vary based on the kinematics of the UAV. Namely, because the tethered hook forms a pendulum suspended from the UAV, the pendulum may be moved or excited to a different extend depending on how quickly the UAV moves (i.e., the driving frequency, and how this driving frequency compares to the resonant frequency of the pendulum), and the phase relationship between motion of the UAV and any swinging of the pendulum. The hook may be more difficult to steer and control as the unspooled length of the tether increases.

In order to more directly control a position of the hook, the UAV system may employ a repositioning device or apparatus configured to control at least the horizontal position of the hook more directly. The repositioning device may be positioned closer to the hook than the UAV and may therefore have more direct control over the horizontal position of the hook than the UAV. The repositioning device may be used in combination with or instead of repositioning the UAV horizontally to steer the hook onto an attachment point on the payload. In addition to controlling the horizontal position of the hook, the repositioning device may control an orientation of the hook so as to orient an opening of the hook (rather than the back thereof) to face the attachment point. Thus, as the position of the hook coincides with the position of the attachment point on the payload, the two will become mechanically coupled, rather than colliding in a way that does not produce coupling. The repositioning device may be controlled by the control system based at least on sensor data indicative of a position of the hook relative to the payload.

In one example, the repositioning device may take the form of two or more wheels coupled to the hook. In order to pick up an object, the hook may be lowered to the ground by the UAV, and may use the wheels to drive itself towards the payload to mechanically couple to an attachment point thereon. The wheels may allow for direct control over the horizontal position and the orientation of the hook. Thus, inaccuracies and oscillations resulting from repositioning the hook horizontally via UAV motion may be reduced or eliminated. After the hook is lowered to the ground onto the wheels, the UAV may maintain a small amount of tension of the tether (e.g., by actuating the spool, or repositioning the UAV) so as to keep it from going slack and getting in the way of the wheels. In an implementation where the hook includes only two wheels, tension may be kept on the tether, and the UAV's horizontal position may be adjusted, so as to keep the hook upright over the two wheels.

Nevertheless, in some implementation, the UAV may let the tether go slack and the hook may be capable of using the wheels to drive over or around the tether. Further, the hook may be balanced in other ways. For example, the hook may include three or more wheels (i.e., the hook may be inherently balanced) or may actuate the motors that drive the wheels based on sensor data from one or more gyroscopes to keep the hook upright over the wheels.

In another example, the repositioning device may take the form of an arm coupled at a first end thereof to the UAV. The arm may include, at a second end thereof, a guide through which the tether extends. The position and orientation of the arm may be adjustable with respect to the UAV in one or more degrees of freedom to control a position of the tether guide. The arm may be positioned underneath the UAV so that the guide encircles or engages the tether at a point closer to the hook than the point at which the UAV engages the tether (i.e., at the spool). Thus, by repositioning the tether guide horizontally with respect to the UAV, the horizontal position of the hook may be controlled more directly than it could be controlled by repositioning the UAV. Repositioning of the hook by way of the arm may steer the hook onto the attachment point on the payload and may also be used to suppress oscillations of the payload during pickup and drop-off (e.g., during winch-up and winch-down).

In a further example, the repositioning device may take the form of a plurality of adjustable fins, airfoils, or other aerodynamic features on the hook. Since the hook is positioned below the UAV, the fins on the hook may be actuated to steer the hook using the downwash of air generated by the UAV as it hovers. The fins may be actuated in coordination with one another to adjust a horizontal position of the hook (i.e., by generating a force on the hook) and an orientation of the hook (i.e., by generating a torque on the hook). In some implementations, the fins may be passive (i.e., not actuated) and may operate to suppress oscillations of the hook by (i) keeping the hook approximately centered underneath the UAV as a result of the downwash of air generated by the UAV and (ii) generating additional drag on the hook in a horizontal direction as the hook swings. The passive fins may be biased into a deployed position or configuration by one or more springs. The fins may be pushed into a hidden or stowed-away configuration when the hook is retracted into the UAV or if it snags on an obstacle in the environment.

In a yet further example, the repositioning device may be implemented as one or more thrusters positioned on the hook or on the tether near the hook. In some implementations, the one or more thrusters may be steerable relative to the hook, and thus the hook may be repositioned in a given horizontal direction by pointing the one or more thrusters so as to apply a force to the hook in the given direction. Alternatively, when the thrusters are fixed, a combination of the thrusters may be actuated to generate a force that will displace the hook in the desired direction. In some implementation, a UAV may use a combination of thrusters, fins, robotic arms, and wheels to control the position of the hook.

As previously mentioned, repositioning devices may be used to control the hook in combination with changes in the position of the UAV, or may obviate the need to reposition the UAV at all. For example, after the UAV arrives at a target pickup location, the UAV may deploy the hook and coordinate its own position with the winch system (i.e., with the unwinding of the spool) to bring the hook to within a threshold distance of the payload. Within examples, the threshold distance may include a distance within which the repositioning device and the winch system are capable of repositioning the hook to mechanically couple it to the payload without further adjustments in the position of the UAV. The threshold distance may depend on the type of repositioning device used by the UAV. Thus, after bringing the hook to within the threshold distance, the UAV may hover in a fixed position above the payload to maintain the hook within this threshold distance. The UAV may perform minor adjustments to its position to compensate for disturbances caused by wind, movement of the tether, and other ambient conditions.

With the UAV hovering in the fixed position above the payload, the repositioning device may be used to guide the hook onto the attachment point on the payload. The control system may determine, based on a current position and orientation of the hook in relation to the attachment point, a trajectory for the hook to follow to coincide with the attachment point on the payload and become coupled thereto. The repositioning device may then be used to move the hook along the trajectory.

Alternatively, in some implementations, the repositioning device may operate in coordination with movements of the UAV. That is, the UAV might not hover in a fixed position above the payload, but may instead reposition itself to move the hook along the determined trajectory. The repositioning device may operate in coordination with changes in the position of the UAV to keep the hook centered on the trajectory and prevent it from oscillating. This approach may allow the accurate and precise control over the hook to be combined with the UAV's ability to move the hook over larger distances than the repositioning device.

II. EXAMPLE UNMANNED VEHICLES

Herein, the terms "unmanned aerial system" and "UAV" refer to any autonomous or semi-autonomous vehicle that is capable of performing some functions without a physically present human pilot. A UAV can take various forms. For example, a UAV may take the form of a fixed-wing aircraft, a glider aircraft, a tail-sitter aircraft, a jet aircraft, a ducted fan aircraft, a lighter-than-air dirigible such as a blimp or steerable balloon, a rotorcraft such as a helicopter or multicopter, and/or an ornithopter, among other possibilities. Further, the terms "drone," "unmanned aerial vehicle system" (UAVS), or "unmanned aerial vehicle" may also be used to refer to a UAV.

FIG. 1A is an isometric view of an example UAV 100. UAV 100 includes wing 102, booms 104, and a fuselage 106. Wings 102 may be stationary and may generate lift based on the wing shape and the UAV's forward airspeed. For instance, the two wings 102 may have an airfoil-shaped cross section to produce an aerodynamic force on UAV 100. In some embodiments, wing 102 may carry horizontal propulsion units 108, and booms 104 may carry vertical propulsion units 110. In operation, power for the propulsion units may be provided from a battery compartment 112 of fuselage 106. In some embodiments, fuselage 106 also includes an avionics compartment 114, an additional battery compartment (not shown) and/or a delivery unit (not shown, e.g., a winch system) for handling the payload. In some embodiments, fuselage 106 is modular, and two or more compartments (e.g., battery compartment 112, avionics compartment 114, other payload and delivery compartments) are detachable from each other and securable to each other (e.g., mechanically, magnetically, or otherwise) to contiguously form at least a portion of fuselage 106.

In some embodiments, booms 104 terminate in rudders 116 for improved yaw control of UAV 100. Further, wings 102 may terminate in wing tips 117 for improved control of lift of the UAV.

In the illustrated configuration, UAV 100 includes a structural frame. The structural frame may be referred to as a "structural H-frame" or an "H-frame" (not shown) of the UAV. The H-frame may include, within wings 102, a wing spar (not shown) and, within booms 104, boom carriers (not shown). In some embodiments the wing spar and the boom carriers may be made of carbon fiber, hard plastic, aluminum, light metal alloys, or other materials. The wing spar and the boom carriers may be connected with clamps. The wing spar may include pre-drilled holes for horizontal propulsion units 108, and the boom carriers may include pre-drilled holes for vertical propulsion units 110.

In some embodiments, fuselage 106 may be removably attached to the H-frame (e.g., attached to the wing spar by clamps, configured with grooves, protrusions or other features to mate with corresponding H-frame features, etc.). In other embodiments, fuselage 106 similarly may be removably attached to wings 102. The removable attachment of fuselage 106 may improve quality and or modularity of UAV 100. For example, electrical/mechanical components and/or subsystems of fuselage 106 may be tested separately from, and before being attached to, the H-frame. Similarly, printed circuit boards (PCBs) 118 may be tested separately from, and before being attached to, the boom carriers, therefore eliminating defective parts/subassemblies prior to completing the UAV. For example, components of fuselage 106 (e.g., avionics, battery unit, delivery units, an additional battery compartment, etc.) may be electrically tested before fuselage 106 is mounted to the H-frame. Furthermore, the motors and the electronics of PCBs 118 may also be electrically tested before the final assembly. Generally, the identification of the defective parts and subassemblies early in the assembly process lowers the overall cost and lead time of the UAV. Furthermore, different types/models of fuselage 106 may be attached to the H-frame, therefore improving the modularity of the design. Such modularity allows these various parts of UAV 100 to be upgraded without a substantial overhaul to the manufacturing process.

In some embodiments, a wing shell and boom shells may be attached to the H-frame by adhesive elements (e.g., adhesive tape, double-sided adhesive tape, glue, etc.). Therefore, multiple shells may be attached to the H-frame instead of having a monolithic body sprayed onto the H-frame. In some embodiments, the presence of the multiple shells reduces the stresses induced by the coefficient of thermal expansion of the structural frame of the UAV. As a result, the UAV may have better dimensional accuracy and/or improved reliability.

Moreover, in at least some embodiments, the same H-frame may be used with the wing shell and/or boom shells having different size and/or design, therefore improving the modularity and versatility of the UAV designs. The wing shell and/or the boom shells may be made of relatively light polymers (e.g., closed cell foam) covered by the harder, but relatively thin, plastic skins.

The power and/or control signals from fuselage 106 may be routed to PCBs 118 through cables running through fuselage 106, wings 102, and booms 104. In the illustrated embodiment, UAV 100 has four PCBs, but other numbers of PCBs are also possible. For example, UAV 100 may include two PCBs, one per the boom. The PCBs carry electronic components 119 including, for example, power converters, controllers, memory, passive components, etc. In operation, propulsion units 108 and 110 of UAV 100 are electrically connected to the PCBs.

Many variations on the illustrated UAV are possible. For instance, fixed-wing UAVs may include more or fewer rotor units (vertical or horizontal), and/or may utilize a ducted fan or multiple ducted fans for propulsion. Further, UAVs with more wings (e.g., an "x-wing" configuration with four wings), are also possible. Although FIG. 1 illustrates two wings 102, two booms 104, two horizontal propulsion units 108, and six vertical propulsion units 110 per boom 104, it should be appreciated that other variants of UAV 100 may be implemented with more or less of these components. For example, UAV 100 may include four wings 102, four booms 104, and more or less propulsion units (horizontal or vertical).

Figure 1B:
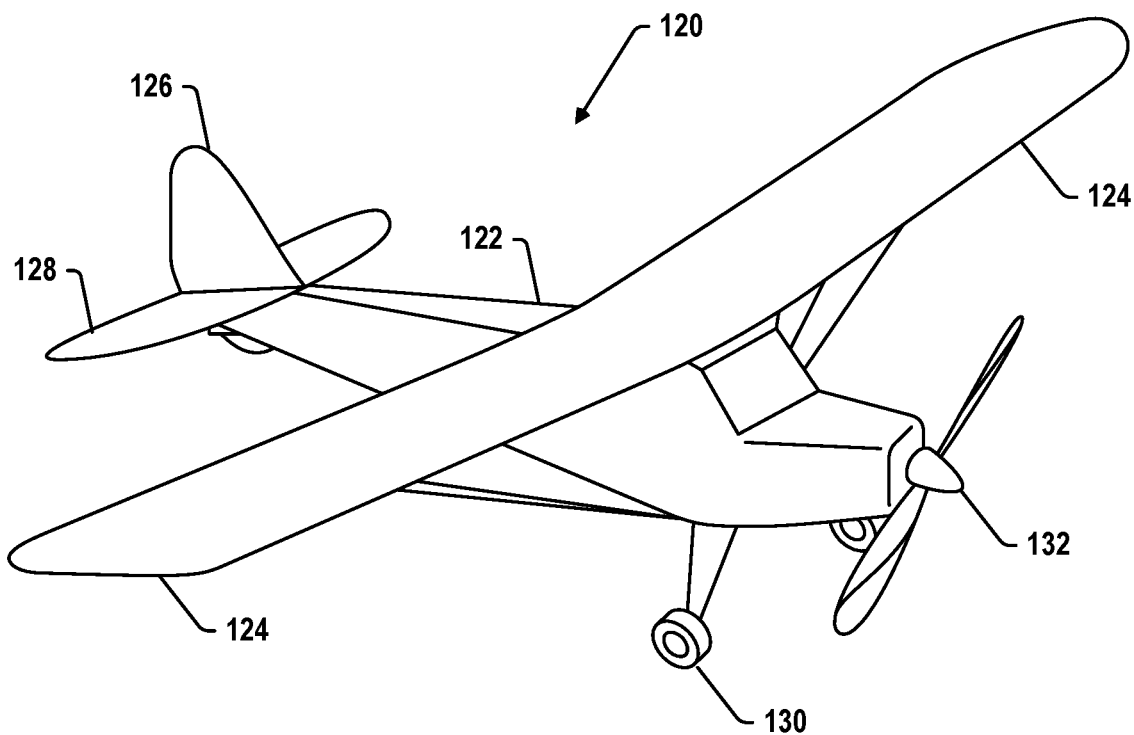
FIG. 1B is a simplified illustration of an unmanned aerial vehicle, in accordance with example embodiments.

Similarly, FIG. 1B shows another example of a fixed-wing UAV 120. Fixed-wing UAV 120 includes fuselage 122, two wings 124 with an airfoil-shaped cross section to provide lift for UAV 120, vertical stabilizer 126 (or fin) to stabilize the plane's yaw (turn left or right), horizontal stabilizer 128 (also referred to as an elevator or tailplane) to stabilize pitch (tilt up or down), landing gear 130, and propulsion unit 132, which can include a motor, shaft, and propeller.

Figure 1C:
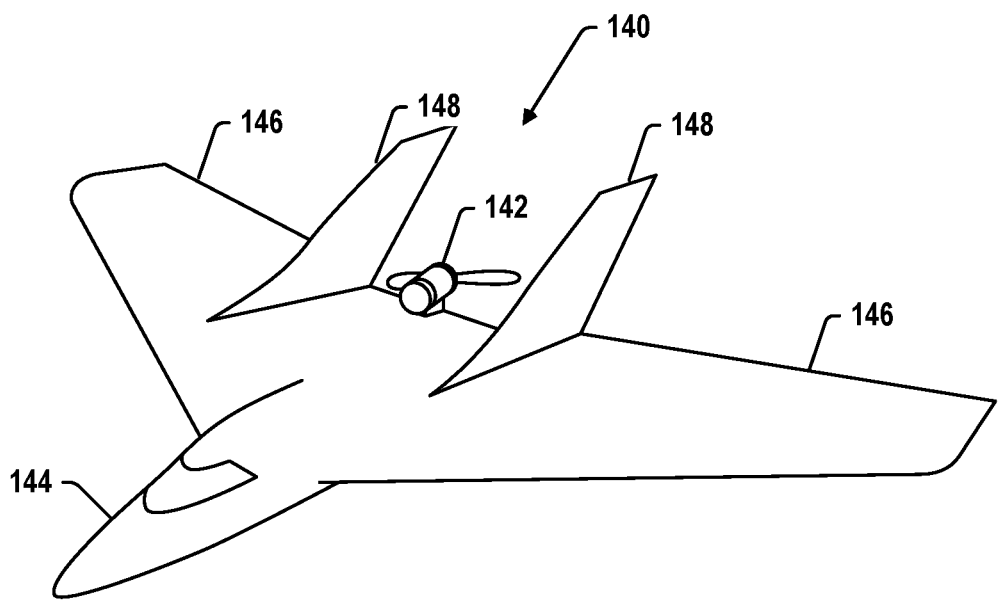
FIG. 1C is a simplified illustration of an unmanned aerial vehicle, in accordance with example embodiments.

FIG. 1C shows an example of UAV 140 with a propeller in a pusher configuration. The term "pusher" refers to the fact that propulsion unit 142 is mounted at the back of UAV 140 and "pushes" the vehicle forward, in contrast to the propulsion unit 142 being mounted at the front of UAV 140. Similar to the description provided for FIGS. 1A and 1B, FIG. 1C depicts common structures used in a pusher plane, including fuselage 144, two wings 146, vertical stabilizers 148, and propulsion unit 142, which can include a motor, shaft, and propeller.

Figure 1D:
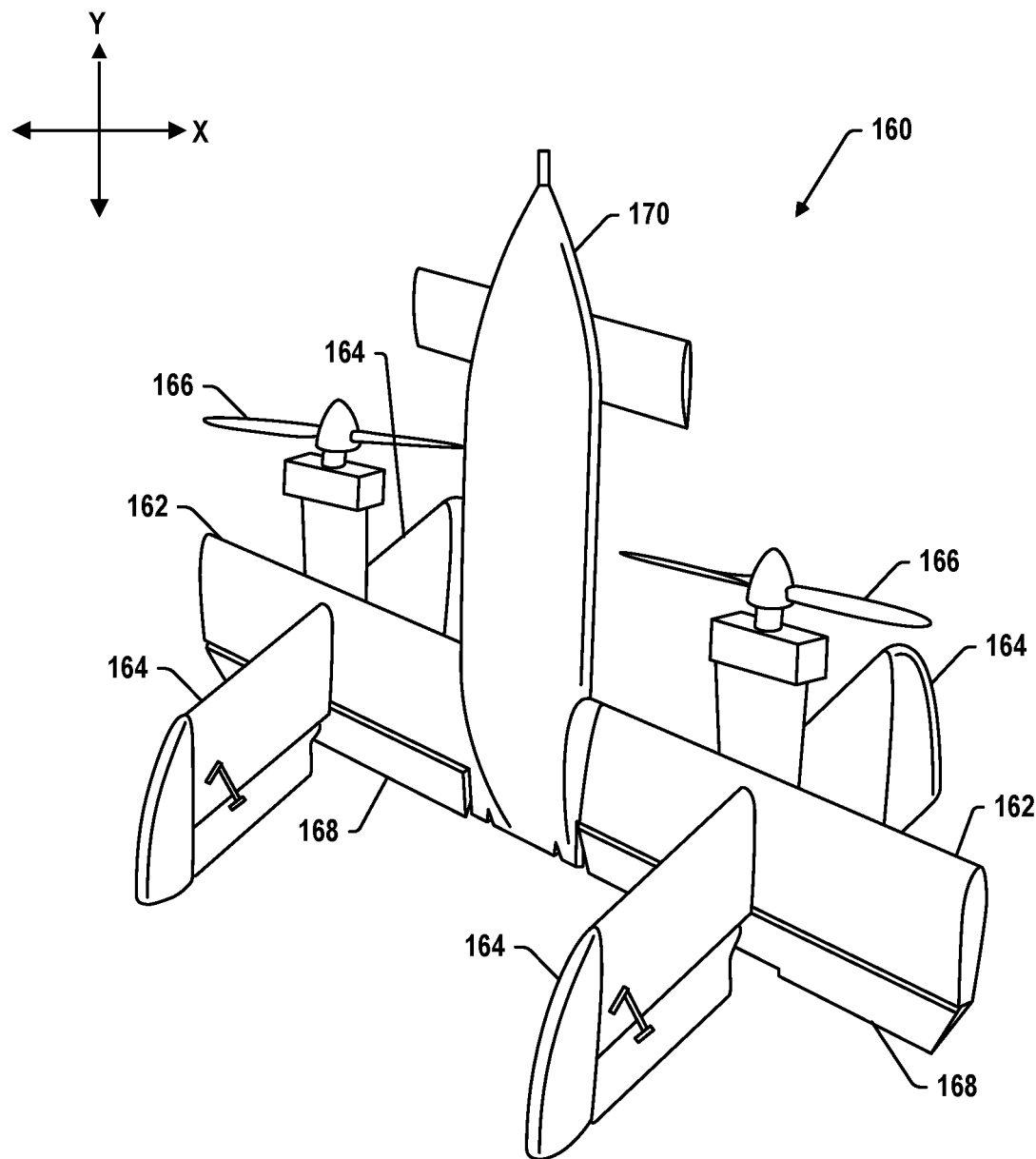
FIG. 1D is a simplified illustration of an unmanned aerial vehicle, in accordance with example embodiments.

FIG. 1D shows an example tail-sitter UAV 160. In the illustrated example, tail-sitter UAV 160 has fixed wings 162 to provide lift and allow UAV 160 to glide horizontally (e.g., along the x-axis, in a position that is approximately perpendicular to the position shown in FIG. 1D). However, fixed wings 162 also allow tail-sitter UAV 160 to take off and land vertically on its own.

For example, at a launch site, tail-sitter UAV 160 may be positioned vertically (as shown) with fins 164 and/or wings 162 resting on the ground and stabilizing UAV 160 in the vertical position. Tail-sitter UAV 160 may then take off by operating propellers 166 to generate an upward thrust (e.g., a thrust that is generally along the y-axis). Once at a suitable altitude, tail-sitter UAV 160 may use flaps 168 to reorient itself in a horizontal position, such that fuselage 170 is closer to being aligned with the x-axis than the y-axis. Positioned horizontally, propellers 166 may provide forward thrust so that tail-sitter UAV 160 can fly in a similar manner as a typical airplane.

Many variations on the illustrated fixed-wing UAVs are possible. For instance, fixed-wing UAVs may include more or fewer propellers, and/or may utilize a ducted fan or multiple ducted fans for propulsion. Further, UAVs with more wings (e.g., an "x-wing" configuration with four wings), with fewer wings, or even with no wings, are also possible.

Figure 1E:
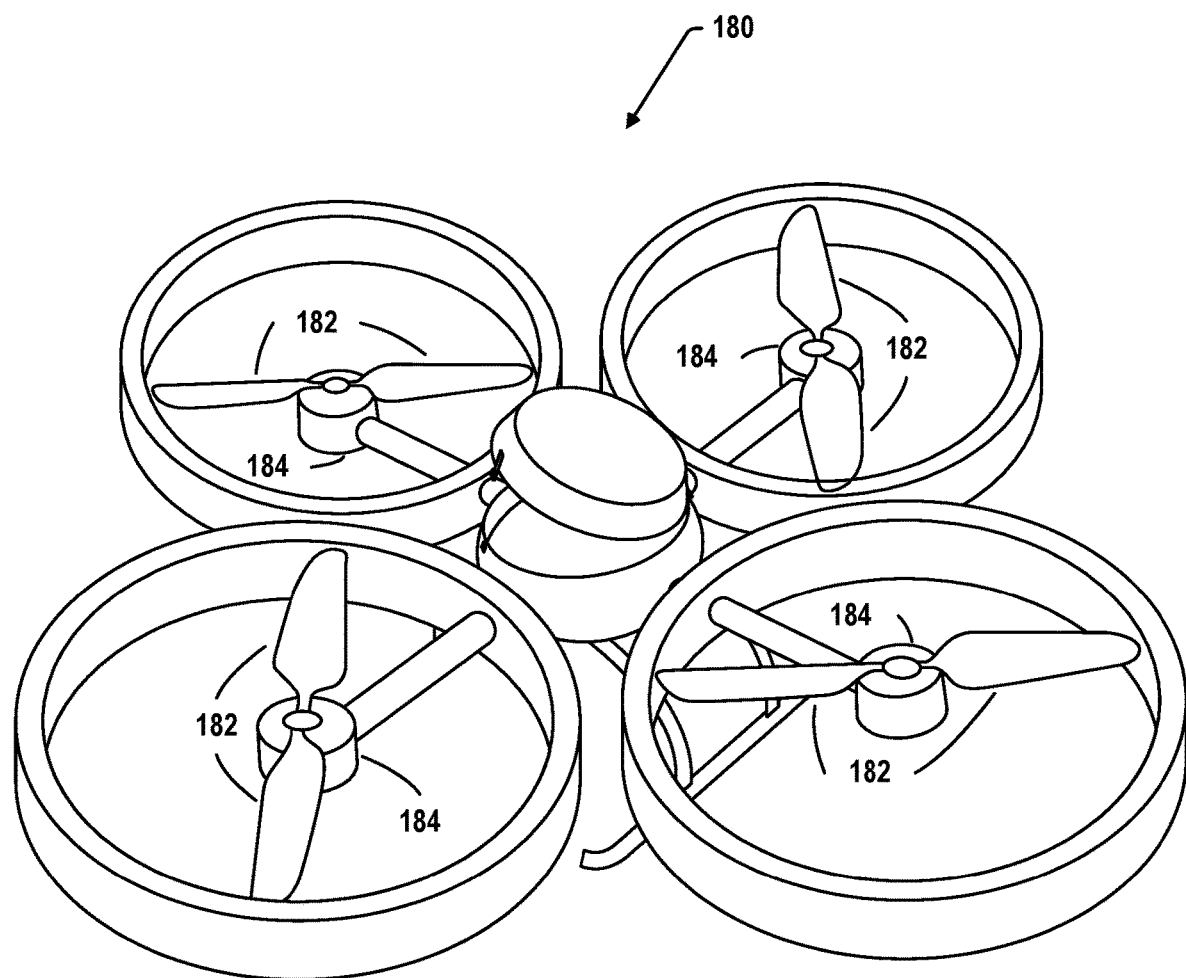
FIG. 1E is a simplified illustration of an unmanned aerial vehicle, in accordance with example embodiments.

As noted above, some embodiments may involve other types of UAVs, in addition to or in the alternative to fixed-wing UAVs. For instance, FIG. 1E shows an example of rotorcraft 180 that is commonly referred to as a multi-copter. Multicopter 180 may also be referred to as a quad-copter, as it includes four rotors 182. It should be understood that example embodiments may involve a rotorcraft with more or fewer rotors than multicopter 180. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 180 in greater detail, four rotors 182 provide propulsion and maneuverability for multicopter 180. More specifically, each rotor 182 includes blades that are attached to motor 184. Configured as such, rotors 182 may allow multicopter 180 to take off and land vertically, to maneuver in any direction, and/or to hover. Further, the pitch of the blades may be adjusted as a group and/or differentially, and may allow multicopter 180 to control its pitch, roll, yaw, and/or altitude.

It should be understood that references herein to an "unmanned" aerial vehicle or UAV can apply equally to autonomous and semi-autonomous aerial vehicles. In an autonomous implementation, all functionality of the aerial vehicle is automated; e.g., pre-programmed or controlled via real-time computer functionality that responds to input from various sensors and/or pre-determined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight controls to achieve the route and avoid obstacles while navigating the route, and so on.

More generally, it should be understood that the example UAVs described herein are not intended to be limiting. Example embodiments may relate to, be implemented within, or take the form of any type of unmanned aerial vehicle.

III. EXAMPLE UAV COMPONENTS

Figure 2:
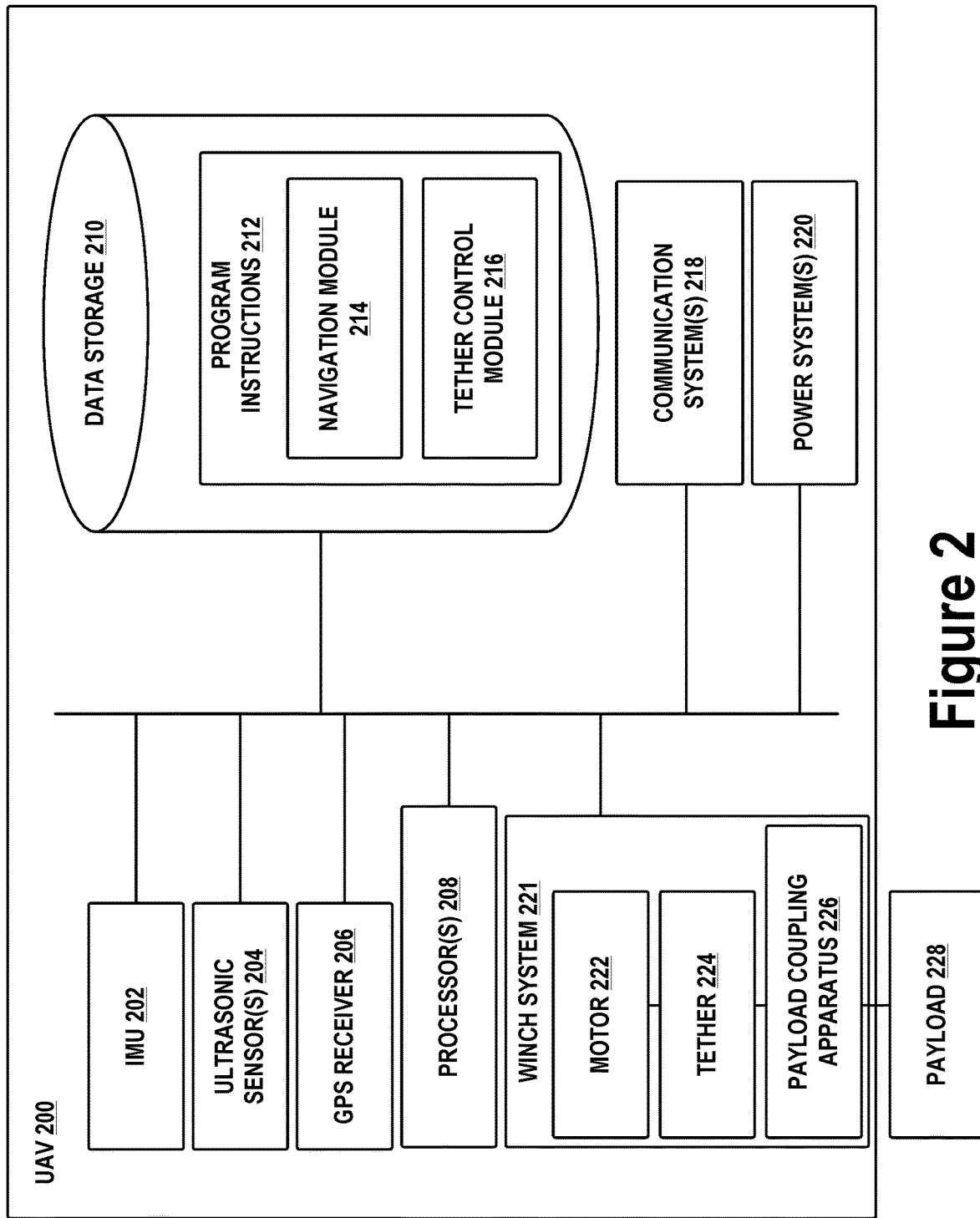
FIG. 2 is a simplified block diagram illustrating components of an unmanned aerial system, in accordance with example embodiments.

FIG. 2 is a simplified block diagram illustrating components of UAV 200, according to an example embodiment. UAV 200 may take the form of, or be similar in form to, one of UAVs 100, 120, 140, 160, and 180 described in reference to FIGS. 1A-1E. However, UAV 200 may also take other forms.

UAV 200 may include various types of sensors, and may include a computing system configured to provide the functionality described herein. In the illustrated embodiment, the sensors of UAV 200 include inertial measurement unit (IMU) 202, ultrasonic sensor(s) 204, and GPS receiver 206, among other possible sensors and sensing systems.

In the illustrated embodiment, UAV 200 also includes processor(s) 208. Processor 208 may be a general-purpose processor or a special purpose processor (e.g., digital signal processors, application specific integrated circuits, etc.). Processor(s) 208 can be configured to execute computer-readable program instructions 212 that are stored in data storage 210 and are executable to provide the functionality of a UAV described herein.

Data storage 210 may include or take the form of one or more computer-readable storage media that can be read or accessed by at least one processor 208. The one or more computer-readable storage media can include volatile and/or non-volatile storage components, such as optical, magnetic, organic or other memory or disc storage, which can be integrated in whole or in part with at least one of processor(s) 208. In some embodiments, data storage 210 can be implemented using a single physical device (e.g., one optical, magnetic, organic or other memory or disc storage unit), while in other embodiments, data storage 210 can be implemented using two or more physical devices.

As noted, data storage 210 can include computer-readable program instructions 212 and perhaps additional data, such as diagnostic data of UAV 200. As such, data storage 210 may include program instructions 212 to perform or facilitate some or all of the UAV functionality described herein. For instance, in the illustrated embodiment, program instructions 212 include navigation module 214 and tether control module 216.

A. Sensors

In an illustrative embodiment, IMU 202 may include both an accelerometer and a gyroscope, which may be used together to determine an orientation of UAV 200. In particular, the accelerometer can measure the orientation of the vehicle with respect to earth, while the gyroscope measures the rate of rotation around an axis. IMUs are commercially available in low-cost, low-power packages. For instance, IMU 202 may take the form of or include a miniaturized MicroElectroMechanical System (MEMS) or a NanoElectroMechanical System (NEMS). Other types of IMUs may also be utilized.

IMU 202 may include other sensors, in addition to accelerometers and gyroscopes, which may help to better determine position and/or help to increase autonomy of UAV 200. Two examples of such sensors are magnetometers and pressure sensors. In some embodiments, a UAV may include a low-power, digital 3-axis magnetometer, which can be used to realize an orientation independent electronic compass for accurate heading information. However, other types of magnetometers may be utilized as well. Other examples are also possible. Further, note that a UAV could include some or all of the above-described inertia sensors as separate components from an IMU.

UAV 200 may also include a pressure sensor or barometer, which can be used to determine the altitude of UAV 200. Alternatively, other sensors, such as sonic altimeters or radar altimeters, can be used to provide an indication of altitude, which may help to improve the accuracy of and/or prevent drift of an IMU.

In a further aspect, UAV 200 may include one or more sensors that allow the UAV to sense objects in the environment. For instance, in the illustrated embodiment, UAV 200 includes ultrasonic sensor(s) 204. Ultrasonic sensor(s) 204 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

In some embodiments, UAV 200 may also include one or more imaging system(s). For example, one or more still and/or video cameras may be utilized by UAV 200 to capture image data from the UAV's environment. As a specific example, charge-coupled device (CCD) cameras or complementary metal-oxide-semiconductor (CMOS) cameras can be used with unmanned vehicles. Such imaging sensor(s) have numerous possible applications, such as obstacle avoidance, localization techniques, ground tracking for more accurate navigation (e.g., by applying optical flow techniques to images), video feedback, and/or image recognition and processing, among other possibilities.

UAV 200 may also include GPS receiver 206. GPS receiver 206 may be configured to provide data that is typical of well-known GPS systems, such as the GPS coordinates of UAV 200. Such GPS data may be utilized by UAV 200 for various functions. As such, the UAV may use GPS receiver 206 to help navigate to the caller's location, as indicated, at least in part, by the GPS coordinates provided by their mobile device. Other examples are also possible.

B. Navigation and Location Determination

Navigation module 214 may provide functionality that allows UAV 200 to, for example, move about its environment and reach a desired location. To do so, navigation module 214 may control the altitude and/or direction of flight by controlling the mechanical features of the UAV that affect flight (e.g., its rudder(s), elevator(s), aileron(s), and/or the speed of its propeller(s)).

In order to navigate UAV 200 to a target location, navigation module 214 may implement various navigation techniques, such as map-based navigation and localization-based navigation, for instance. With map-based navigation, UAV 200 may be provided with a map of its environment, which may then be used to navigate to a particular location on the map. With localization-based navigation, UAV 200 may be capable of navigating in an unknown environment using localization. Localization-based navigation may involve UAV 200 building its own map of its environment and calculating its position within the map and/or the position of objects in the environment. For example, as UAV 200 moves throughout its environment, UAV 200 may continuously use localization to update its map of the environment. This continuous mapping process may be referred to as simultaneous localization and mapping (SLAM). Other navigation techniques may also be utilized.

In some embodiments, navigation module 214 may navigate using a technique that relies on waypoints. In particular, waypoints are sets of coordinates that identify points in physical space. For instance, an air-navigation waypoint may be defined by a certain latitude, longitude, and altitude. Accordingly, navigation module 214 may cause UAV 200 to move from waypoint to waypoint, in order to ultimately travel to a final destination (e.g., a final waypoint in a sequence of waypoints).

In a further aspect, navigation module 214 and/or other components and systems of UAV 200 may be configured for "localization" to more precisely navigate to the scene of a target location. More specifically, it may be desirable in certain situations for a UAV to be within a threshold distance of the target location where payload 228 is being delivered by a UAV (e.g., within a few feet of the target destination). To this end, a UAV may use a two-tiered approach in which it uses a more-general location-determination technique to navigate to a general area that is associated with the target location, and then use a more-refined location-determination technique to identify and/or navigate to the target location within the general area.

For example, UAV 200 may navigate to the general area of a target destination where payload 228 is being delivered using waypoints and/or map-based navigation. The UAV may then switch to a mode in which it utilizes a localization process to locate and travel to a more specific location. For instance, if UAV 200 is to deliver a payload to a user's home, UAV 200 may need to be substantially close to the target location in order to avoid delivery of the payload to undesired areas (e.g., onto a roof, into a pool, onto a neighbor's property, etc.). However, a GPS signal may only get UAV 200 so far (e.g., within a block of the user's home). A more precise location-determination technique may then be used to find the specific target location.

Various types of location-determination techniques may be used to accomplish localization of the target delivery location once UAV 200 has navigated to the general area of the target delivery location. For instance, UAV 200 may be equipped with one or more sensory systems, such as, for example, ultrasonic sensors 204, infrared sensors (not shown), and/or other sensors, which may provide input that navigation module 214 utilizes to navigate autonomously or semi-autonomously to the specific target location.

As another example, once UAV 200 reaches the general area of the target delivery location (or of a moving subject such as a person or their mobile device), UAV 200 may switch to a "fly-by-wire" mode where it is controlled, at least in part, by a remote operator, who can navigate UAV 200 to the specific target location. To this end, sensory data from UAV 200 may be sent to the remote operator to assist them in navigating UAV 200 to the specific location.

As yet another example, UAV 200 may include a module that is able to signal to a passer-by for assistance in reaching the specific target delivery location. For example, the UAV 200 may display a visual message requesting such assistance in a graphic display or play an audio message or tone through speakers to indicate the need for such assistance, among other possibilities. Such a visual or audio message might indicate that assistance is needed in delivering UAV 200 to a particular person or a particular location, and might provide information to assist the passer-by in delivering UAV 200 to the person or location (e.g., a description or picture of the person or location, and/or the person or location's name), among other possibilities. Such a feature can be useful in a scenario in which the UAV is unable to use sensory functions or another location-determination technique to reach the specific target location. However, this feature is not limited to such scenarios.

In some embodiments, once UAV 200 arrives at the general area of a target delivery location, UAV 200 may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., via an RF signal, a light signal and/or an audio signal). In this scenario, UAV 200 may be configured to navigate by "sourcing" such directional signals—in other words, by determining where the signal is strongest and navigating accordingly. As another example, a mobile device can emit a frequency, either in the human range or outside the human range, and UAV 200 can listen for that frequency and navigate accordingly. As a related example, if UAV 200 is listening for spoken commands, then UAV 200 could utilize spoken statements, such as "I'm over here!" to source the specific location of the person requesting delivery of a payload.

In an alternative arrangement, a navigation module may be implemented at a remote computing device, which communicates wirelessly with UAV 200. The remote computing device may receive data indicating the operational state of UAV 200, sensor data from UAV 200 that allows it to assess the environmental conditions being experienced by UAV 200, and/or location information for UAV 200. Provided with such information, the remote computing device may determine altitudinal and/or directional adjustments that should be made by UAV 200 and/or may determine how UAV 200 should adjust its mechanical features (e.g., its rudder(s), elevator(s), aileron(s), and/or the speed of its propeller(s)) in order to effectuate such movements. The remote computing system may then communicate such adjustments to UAV 200 so it can move in the determined manner.

C. Communication Systems

In a further aspect, UAV 200 includes one or more communication system(s) 218. Communications system(s) 218 may include one or more wireless interfaces and/or one or more wireline interfaces, which allow UAV 200 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In some embodiments, UAV 200 may include communication systems 218 that allow for both short-range communication and long-range communication. For example, UAV 200 may be configured for short-range communications using Bluetooth and for long-range communications under a CDMA protocol. In such an embodiment, UAV 200 may be configured to function as a "hot spot;" or in other words, as a gateway or proxy between a remote support device and one or more data networks, such as a cellular network and/or the Internet. Configured as such, UAV 200 may facilitate data communications that the remote support device would otherwise be unable to perform by itself.

For example, UAV 200 may provide a WiFi connection to a remote device, and serve as a proxy or gateway to a cellular service provider's data network, which the UAV might connect to under an LTE or a 3G protocol, for instance. UAV 200 could also serve as a proxy or gateway to a high-altitude balloon network, a satellite network, or a combination of these networks, among others, which a remote device might not be able to otherwise access.

D. Power Systems

In a further aspect, UAV 200 may include power system(s) 220. Power system(s) 220 may include one or more batteries for providing power to UAV 200. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payload Delivery

UAV 200 may employ various systems and configurations in order to transport and deliver payload 228. In some implementations, payload 228 of UAV 200 may include or take the form of a "package" designed to transport various goods to a target delivery location. For example, UAV 200 can include a compartment, in which an item or items may be transported. Such a package may one or more food items, purchased goods, medical items, or any other object(s) having a size and weight suitable to be transported between two locations by the UAV. In other embodiments, payload 228 may simply be the one or more items that are being delivered (e.g., without any package housing the items).

In some embodiments, payload 228 may be attached to the UAV and located substantially outside of the UAV during some or all of a flight by the UAV. For example, the package may be tethered or otherwise releasably attached below the UAV during flight to a target location. In an embodiment where a package carries goods below the UAV, the package may include various features that protect its contents from the environment, reduce aerodynamic drag on the system, and prevent the contents of the package from shifting during UAV flight.

For instance, when payload 228 takes the form of a package for transporting items, the package may include an outer shell constructed of water-resistant cardboard, plastic, or any other lightweight and water-resistant material. Further, in order to reduce drag, the package may feature smooth surfaces with a pointed front that reduces the frontal cross-sectional area. Further, the sides of the package may taper from a wide bottom to a narrow top, which allows the package to serve as a narrow pylon that reduces interference effects on the wing(s) of the UAV. This may move some of the frontal area and volume of the package away from the wing(s) of the UAV, thereby preventing the reduction of lift on the wing(s) cause by the package. Yet further, in some embodiments, the outer shell of the package may be constructed from a single sheet of material in order to reduce air gaps or extra material, both of which may increase drag on the system. Additionally or alternatively, the package may include a stabilizer to dampen package flutter. This reduction in flutter may allow the package to have a less rigid connection to the UAV and may cause the contents of the package to shift less during flight.

In order to deliver the payload, the UAV may include winch system 221 controlled by tether control module 216 in order to lower payload 228 to the ground while UAV 200 hovers above. As shown in FIG. 2, winch system 221 may include tether 224, and tether 224 may be coupled to payload 228 by payload coupling apparatus 226. Tether 224 may be wound on a spool that is coupled to motor 222 of the UAV. Motor 222 may take the form of a DC motor (e.g., a servo motor) that can be actively controlled by a speed controller. Tether control module 216 can control the speed controller to cause motor 222 to rotate the spool, thereby unwinding or retracting tether 224 and lowering or raising payload coupling apparatus 226. In practice, the speed controller may output a desired operating rate (e.g., a desired RPM) for the spool, which may correspond to the speed at which tether 224 and payload 228 should be lowered towards the ground. Motor 222 may then rotate the spool so that it maintains the desired operating rate.

In order to control motor 222 via the speed controller, tether control module 216 may receive data from a speed sensor (e.g., an encoder) configured to convert a mechanical position to a representative analog or digital signal. In particular, the speed sensor may include a rotary encoder that may provide information related to rotary position (and/or rotary movement) of a shaft of the motor or the spool coupled to the motor, among other possibilities. Moreover, the speed sensor may take the form of an absolute encoder and/or an incremental encoder, among others. So in an example implementation, as motor 222 causes rotation of the spool, a rotary encoder may be used to measure this rotation. In doing so, the rotary encoder may be used to convert a rotary position to an analog or digital electronic signal used by tether control module 216 to determine the amount of rotation of the spool from a fixed reference angle and/or to an analog or digital electronic signal that is representative of a new rotary position, among other options. Other examples are also possible.

Based on the data from the speed sensor, tether control module 216 may determine a rotational speed of motor 222 and/or the spool and responsively control motor 222 (e.g., by increasing or decreasing an electrical current supplied to motor 222) to cause the rotational speed of motor 222 to match a desired speed. When adjusting the motor current, the magnitude of the current adjustment may be based on a proportional-integral-derivative (PID) calculation using the determined and desired speeds of motor 222. For instance, the magnitude of the current adjustment may be based on a present difference, a past difference (based on accumulated error over time), and a future difference (based on current rates of change) between the determined and desired speeds of the spool.

In some embodiments, tether control module 216 may vary the rate at which tether 224 and payload 228 are lowered to the ground. For example, the speed controller may change the desired operating rate according to a variable deployment-rate profile and/or in response to other factors in order to change the rate at which payload 228 descends toward the ground. To do so, tether control module 216 may adjust an amount of braking or an amount of friction that is applied to tether 224. For example, to vary the tether deployment rate, UAV 200 may include friction pads that can apply a variable amount of pressure to tether 224. As another example, UAV 200 can include a motorized braking system that varies the rate at which the spool lets out tether 224. Such a braking system may take the form of an electromechanical system in which motor 222 operates to slow the rate at which the spool lets out tether 224. Further, motor 222 may vary the amount by which it adjusts the speed (e.g., the RPM) of the spool, and thus may vary the deployment rate of tether 224. Other examples are also possible.

In some embodiments, tether control module 216 may be configured to limit the motor current supplied to motor 222 to a maximum value. With such a limit placed on the motor current, there may be situations where motor 222 cannot operate at the desired rate specified by the speed controller. For instance, there may be situations where the speed controller specifies a desired operating rate at which motor 222 should retract tether 224 toward UAV 200, but the motor current may be limited such that a large enough downward force on tether 224 would counteract the retracting force of motor 222 and cause tether 224 to unwind instead. A limit on the motor current may be imposed and/or altered depending on an operational state of UAV 200.

In some embodiments, tether control module 216 may be configured to determine a status of tether 224 and/or payload 228 based on the amount of current supplied to motor 222. For instance, if a downward force is applied to tether 224 (e.g., if payload 228 is attached to tether 224 or if tether 224 gets snagged on an object when retracting toward UAV 200), tether control module 216 may need to increase the motor current in order to cause the determined rotational speed of motor 222 and/or spool to match the desired speed. Similarly, when the downward force is removed from tether 224 (e.g., upon delivery of payload 228 or removal of a tether snag), tether control module 216 may need to decrease the motor current in order to cause the determined rotational speed of motor 222 and/or spool to match the desired speed. As such, tether control module 216 may be configured to monitor the current supplied to motor 222. For instance, tether control module 216 could determine the motor current based on sensor data received from a current sensor of the motor or a current sensor of power system 220. In any case, based on the current supplied to motor 222, tether control module 216 may determine if payload 228 is attached to tether 224, if someone or something is pulling on tether 224, and/or if payload coupling apparatus 226 is pressing against UAV 200 after retracting tether 224. Other examples are possible as well.

During delivery of payload 228, payload coupling apparatus 226 can be configured to secure payload 228 while being lowered from the UAV by tether 224, and can be further configured to release payload 228 upon reaching ground level. Payload coupling apparatus 226 can then be retracted to the UAV by reeling in tether 224 using motor 222.

In some implementations, payload 228 may be passively released once it is lowered to the ground. For example, a passive release mechanism may include one or more swing arms adapted to retract into and extend from a housing. An extended swing arm may form a hook on which payload 228 may be attached. Upon lowering the release mechanism and payload 228 to the ground via a tether, a gravitational force as well as a downward inertial force on the release mechanism may cause payload 228 to detach from the hook allowing the release mechanism to be raised upwards toward the UAV. The release mechanism may further include a spring mechanism that biases the swing arm to retract into the housing when there are no other external forces on the swing arm. For instance, a spring may exert a force on the swing arm that pushes or pulls the swing arm toward the housing such that the swing arm retracts into the housing once the weight of payload 228 no longer forces the swing arm to extend from the housing. Retracting the swing arm into the housing may reduce the likelihood of the release mechanism snagging payload 228 or other nearby objects when raising the release mechanism toward the UAV upon delivery of payload 228.

Active payload release mechanisms are also possible. For example, sensors such as a barometric pressure based altimeter and/or accelerometers may help to detect the position of the release mechanism (and the payload) relative to the ground. Data from the sensors can be communicated back to the UAV and/or a control system over a wireless link and used to help in determining when the release mechanism has reached ground level (e.g., by detecting a measurement with the accelerometer that is characteristic of ground impact). In other examples, the UAV may determine that the payload has reached the ground based on a weight sensor detecting a threshold low downward force on the tether and/or based on a threshold low measurement of power drawn by the winch when lowering the payload.

Other systems and techniques for delivering a payload, in addition or in the alternative to a tethered delivery system are also possible. For example, UAV 200 could include an air-bag drop system or a parachute drop system. Alternatively, UAV 200 carrying a payload could simply land on the ground at a delivery location. Other examples are also possible.

IV. EXAMPLE UAV DEPLOYMENT SYSTEMS

Figure 3:
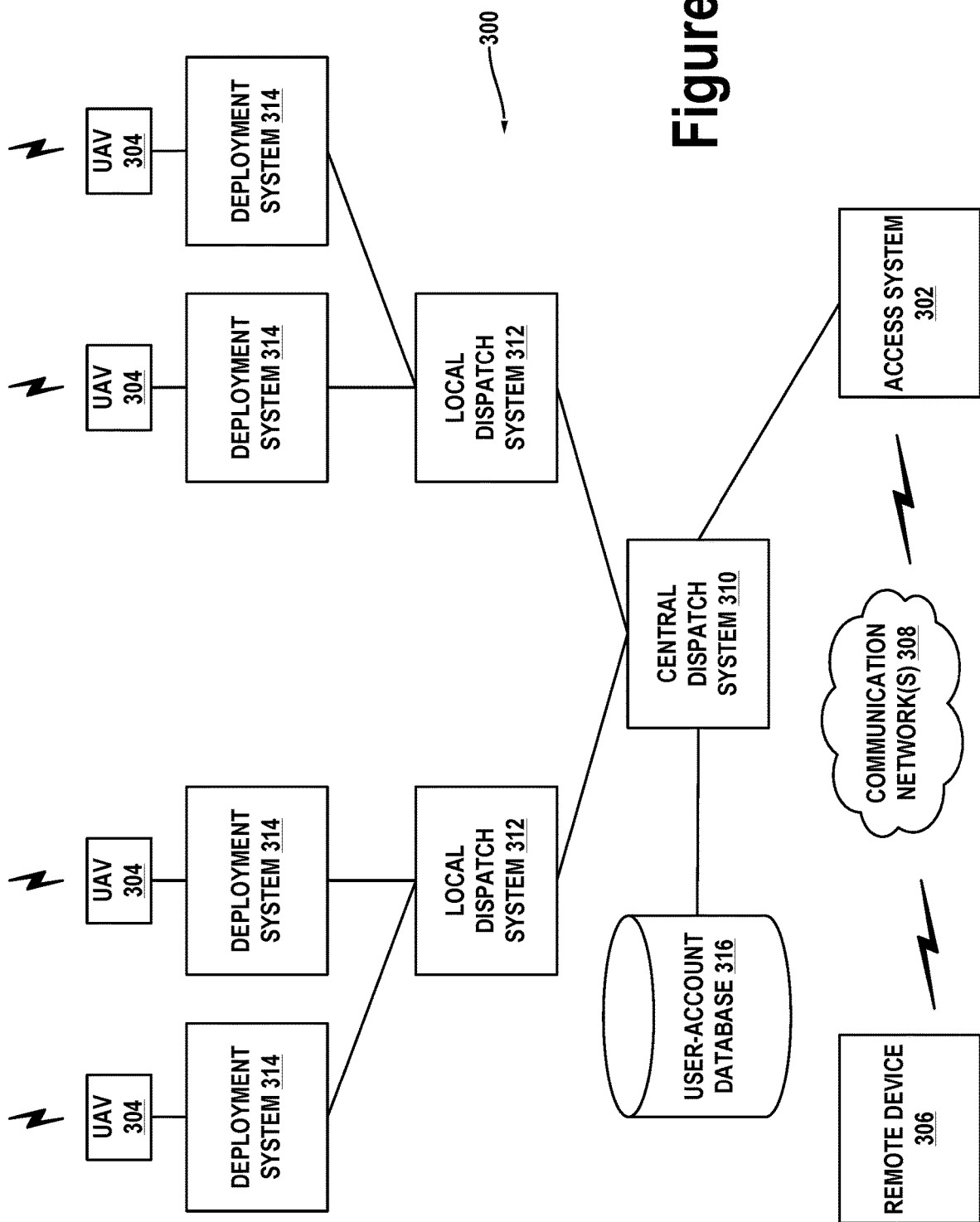
FIG. 3 is a simplified block diagram illustrating a distributed UAV system, in accordance with example embodiments.

UAV systems may be implemented in order to provide various UAV-related services. In particular, UAVs may be provided at a number of different launch sites that may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to provide on-demand transport of various items to locations throughout the geographic area. FIG. 3 is a simplified block diagram illustrating a distributed UAV system 300, according to an example embodiment.

In the illustrative UAV system 300, access system 302 may allow for interaction with, control of, and/or utilization of a network of UAVs 304. In some embodiments, access system 302 may be a computing system that allows for human-controlled dispatch of UAVs 304. As such, the control system may include or otherwise provide a user interface through which a user can access and/or control UAVs 304.

In some embodiments, dispatch of UAVs 304 may additionally or alternatively be accomplished via one or more automated processes. For instance, access system 302 may dispatch one of UAVs 304 to transport a payload to a target location, and the UAV may autonomously navigate to the target location by utilizing various on-board sensors, such as a GPS receiver and/or other various navigational sensors.

Further, access system 302 may provide for remote operation of a UAV. For instance, access system 302 may allow an operator to control the flight of a UAV via its user interface. As a specific example, an operator may use access system 302 to dispatch one of UAVs 304 to a target location. The dispatched UAV may then autonomously navigate to the general area of the target location. At this point, the operator may use access system 302 to take control of the dispatched UAV and navigate the dispatched UAV to the target location (e.g., to a particular person to whom a payload is being transported). Other examples of remote operation of a UAV are also possible.

In an illustrative embodiment, UAVs 304 may take various forms. For example, each of UAVs 304 may be a UAV such as those illustrated in FIG. 1A, 1B, 1C, 1D, 1E, or 2. However, UAV system 300 may also utilize other types of UAVs without departing from the scope of the invention. In some implementations, all of UAVs 304 may be of the same or a similar configuration. However, in other implementations, UAVs 304 may include a number of different types of UAVs. For instance, UAVs 304 may include a number of types of UAVs, with each type of UAV being configured for a different type or types of payload delivery capabilities.

UAV system 300 may further include remote device 306, which may take various forms. Generally, remote device 306 may be any device through which a direct or indirect request to dispatch a UAV can be made. Note that an indirect request may involve any communication that may be responded to by dispatching a UAV, such as requesting a package delivery. In an example embodiment, remote device 306 may be a mobile phone, tablet computer, laptop computer, personal computer, or any network-connected computing device. Further, in some instances, remote device 306 may not be a computing device. As an example, a standard telephone, which allows for communication via plain old telephone service (POTS), may serve as remote device 306. Other types of remote devices are also possible.

Further, remote device 306 may be configured to communicate with access system 302 via one or more types of communication network(s) 308. For example, remote device 306 may communicate with access system 302 (or a human operator of access system 302) by communicating over a POTS network, a cellular network, and/or a data network such as the Internet. Other types of networks may also be utilized.

In some embodiments, remote device 306 may be configured to allow a user to request pick-up of one or more items from a certain source location and/or delivery of one or more items to a desired location. For example, a user could request UAV delivery of a package to their home via their mobile phone, tablet, or laptop. As another example, a user could request dynamic delivery to wherever they are located at the time of delivery. To provide such dynamic delivery, UAV system 300 may receive location information (e.g., GPS coordinates, etc.) from the user's mobile phone, or any other device on the user's person, such that a UAV can navigate to the user's location (as indicated by their mobile phone).

In some embodiments, a business user (e.g., a restaurant) could utilize one or more remote devices 306 to request that a UAV be dispatched to pick-up one or more items (e.g., a food order) from a source location (e.g., the restaurant's address), and then deliver the one or more items to a target location (e.g., a customer's address). Further, in such embodiments, there may be multiple instances of remote device 306 associated with a common item provider account (e.g., an account used by multiple employees and/or owners of a particular restaurant). Additionally, in such embodiments, remote device 306 may be utilized to send item provider submissions to a transport provider computing system (e.g., central dispatch system 310 and or local dispatch system 312), which each indicate a respective quantitative measure for a given amount of UAV transport service at a given future time. For example, remote device 306 may be utilized to generate and send an item provider submission that specifies a level of desired UAV transport services (e.g., number and/or rate of expected UAV delivery flights), and/or a monetary value corresponding to the item provider's need for UAV transport services, at a particular time or during a particular period of time in the future.

In an illustrative arrangement, central dispatch system 310 may be a server or group of servers, which is configured to receive dispatch messages requests and/or dispatch instructions from access system 302. Such dispatch messages may request or instruct central dispatch system 310 to coordinate the deployment of UAVs to various target locations. Central dispatch system 310 may be further configured to route such requests or instructions to one or more local dispatch systems 312. To provide such functionality, central dispatch system 310 may communicate with access system 302 via a data network, such as the Internet or a private network that is established for communications between access systems and automated dispatch systems.

In the illustrated configuration, central dispatch system 310 may be configured to coordinate the dispatch of UAVs 304 from a number of different local dispatch systems 312. As such, central dispatch system 310 may keep track of which ones of UAVs 304 are located at which ones of local dispatch systems 312, which UAVs 304 are currently available for deployment, and/or which services or operations each of UAVs 304 is configured for (in the event that a UAV fleet includes multiple types of UAVs configured for different services and/or operations). Additionally or alternatively, each local dispatch system 312 may be configured to track which of its associated UAVs 304 are currently available for deployment and/or are currently in the midst of item transport.

In some cases, when central dispatch system 310 receives a request for UAV-related service (e.g., transport of an item) from access system 302, central dispatch system 310 may select a specific one of UAVs 304 to dispatch. Central dispatch system 310 may accordingly instruct local dispatch system 312 that is associated with the selected UAV to dispatch the selected UAV. Local dispatch system 312 may then operate its associated deployment system 314 to launch the selected UAV. In other cases, central dispatch system 310 may forward a request for a UAV-related service to one of local dispatch systems 312 that is near the location where the support is requested and leave the selection of a particular one of UAVs 304 to local dispatch system 312.

In an example configuration, local dispatch system 312 may be implemented as a computing system at the same location as deployment system(s) 314 that it controls. For example, a particular one of local dispatch system 312 may be implemented by a computing system installed at a building, such as a warehouse, where deployment system(s) 314 and UAV(s) 304 that are associated with the particular one of local dispatch systems 312 are also located. In other embodiments, the particular one of local dispatch systems 312 may be implemented at a location that is remote to its associated deployment system(s) 314 and UAV(s) 304.

Numerous variations on and alternatives to the illustrated configuration of UAV system 300 are possible. For example, in some embodiments, a user of remote device 306 could request delivery of a package directly from central dispatch system 310. To do so, an application may be implemented on remote device 306 that allows the user to provide information regarding a requested delivery, and generate and send a data message to request that UAV system 300 provide the delivery. In such an embodiment, central dispatch system 310 may include automated functionality to handle requests that are generated by such an application, evaluate such requests, and, if appropriate, coordinate with an appropriate local dispatch system 312 to deploy a UAV.

Further, some or all of the functionality that is attributed herein to central dispatch system 310, local dispatch system(s) 312, access system 302, and/or deployment system(s) 314 may be combined in a single system, implemented in a more complex system (e.g., having more layers of control), and/or redistributed among central dispatch system 310, local dispatch system(s) 312, access system 302, and/or deployment system(s) 314 in various ways.

Yet further, while each local dispatch system 312 is shown as having two associated deployment systems 314, a given local dispatch system 312 may alternatively have more or fewer associated deployment systems 314. Similarly, while central dispatch system 310 is shown as being in communication with two local dispatch systems 312, central dispatch system 310 may alternatively be in communication with more or fewer local dispatch systems 312.

In a further aspect, deployment systems 314 may take various forms. In some implementations, some or all of deployment systems 314 may be a structure or system that passively facilitates a UAV taking off from a resting position to begin a flight. For example, some or all of deployment systems 314 may take the form of a landing pad, a hangar, and/or a runway, among other possibilities. As such, a given deployment system 314 may be arranged to facilitate deployment of one UAV 304 at a time, or deployment of multiple UAVs (e.g., a landing pad large enough to be utilized by multiple UAVs concurrently).

Additionally or alternatively, some or all of deployment systems 314 may take the form of or include systems for actively launching one or more of UAVs 304. Such launch systems may include features that provide for an automated UAV launch and/or features that allow for a human-assisted UAV launch. Further, a given deployment system 314 may be configured to launch one particular UAV 304, or to launch multiple UAVs 304.

Note that deployment systems 314 may also be configured to passively facilitate and/or actively assist a UAV when landing. For example, the same landing pad could be used for take-off and landing. Additionally or alternatively, a deployment system could include a robotic arm operable to receive an incoming UAV. Deployment system 314 could also include other structures and/or systems to assist and/or facilitate UAV landing processes. Further, structures and/or systems to assist and/or facilitate UAV landing processes may be implemented as separate structures and/or systems, so long as UAVs can move or be moved from a landing structure or system to deployment system 314 for re-deployment.

Deployment systems 314 may further be configured to provide additional functions, including for example, diagnostic-related functions such as verifying system functionality of the UAV, verifying functionality of devices that are housed within a UAV (e.g., a payload delivery apparatus), and/or maintaining devices or other items that are housed in the UAV (e.g., by monitoring a status of a payload such as its temperature, weight, etc.).

In some embodiments, local dispatch systems 312 (along with their respective deployment system(s) 314 may be strategically distributed throughout an area such as a city. For example, local dispatch systems 312 may be strategically distributed such that each local dispatch systems 312 is proximate to one or more payload pickup locations (e.g., near a restaurant, store, or warehouse). However, local dispatch systems 312 may be distributed in other ways, depending upon the particular implementation.

As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, UAV system 300 may include or have access to user-account database 316. User-account database 316 may include data for a number of user accounts, and which are each associated with one or more person. For a given user account, user-account database 316 may include data related to or useful in providing UAV-related services. Typically, the user data associated with each user account is optionally provided by an associated user and/or is collected with the associated user's permission.

Further, in some embodiments, a person may be required to register for a user account with UAV system 300, if they wish to be provided with UAV-related services by UAVs 304 from UAV system 300. As such, user-account database 316 may include authorization information for a given user account (e.g., a user name and password), and/or other information that may be used to authorize access to a user account.

In some embodiments, a person may associate one or more of their devices with their user account, such that they can access the services of UAV system 300. For example, when a person uses an associated mobile phone to, e.g., place a call to an operator of access system 302 or send a message requesting a UAV-related service to a dispatch system, the phone may be identified via a unique device identification number, and the call or message may then be attributed to the associated user account. Other examples are also possible.

Additionally or alternatively, an item provider that wishes to deliver their products using UAV transport services provided by an aerial transport service provider (ATSP) to deliver, can register for an item provider account with UAV system 300. As such, user-account database 316 may include authorization information for a given item provider account (e.g., one or more user name and password combinations), and/or other information that may be used to authorize access to a given item provider account. Alternatively, data for item provider accounts may be kept in a separate database from recipient user accounts. Other data structures and storage configurations for storing such account data are also possible.

V. UAV TRANSPORT SERVICES WITH SEPARATELY LOCATED ITEM PROVIDERS AND UAV HUBS

An ATSP may be a separate entity from the entity or entities that provide the items being transported and/or interface with the recipients who request delivery of these items. For example, a company that operates a fleet of UAVs configured for item delivery may provide delivery services for third-party entities, such as restaurants, clothing stores, grocery stores, and other "brick and mortar" and/or online retailers, among other possibilities. These third-party entities may have accounts with the ATSP, via which the third-parties can request and/or purchase UAV transport services from the ATSP. Further, the third-party entities could interface with recipients (e.g., customers) directly, or through computing systems (e.g., applications and/or server systems) provided by the ATSP.

Figure 4:
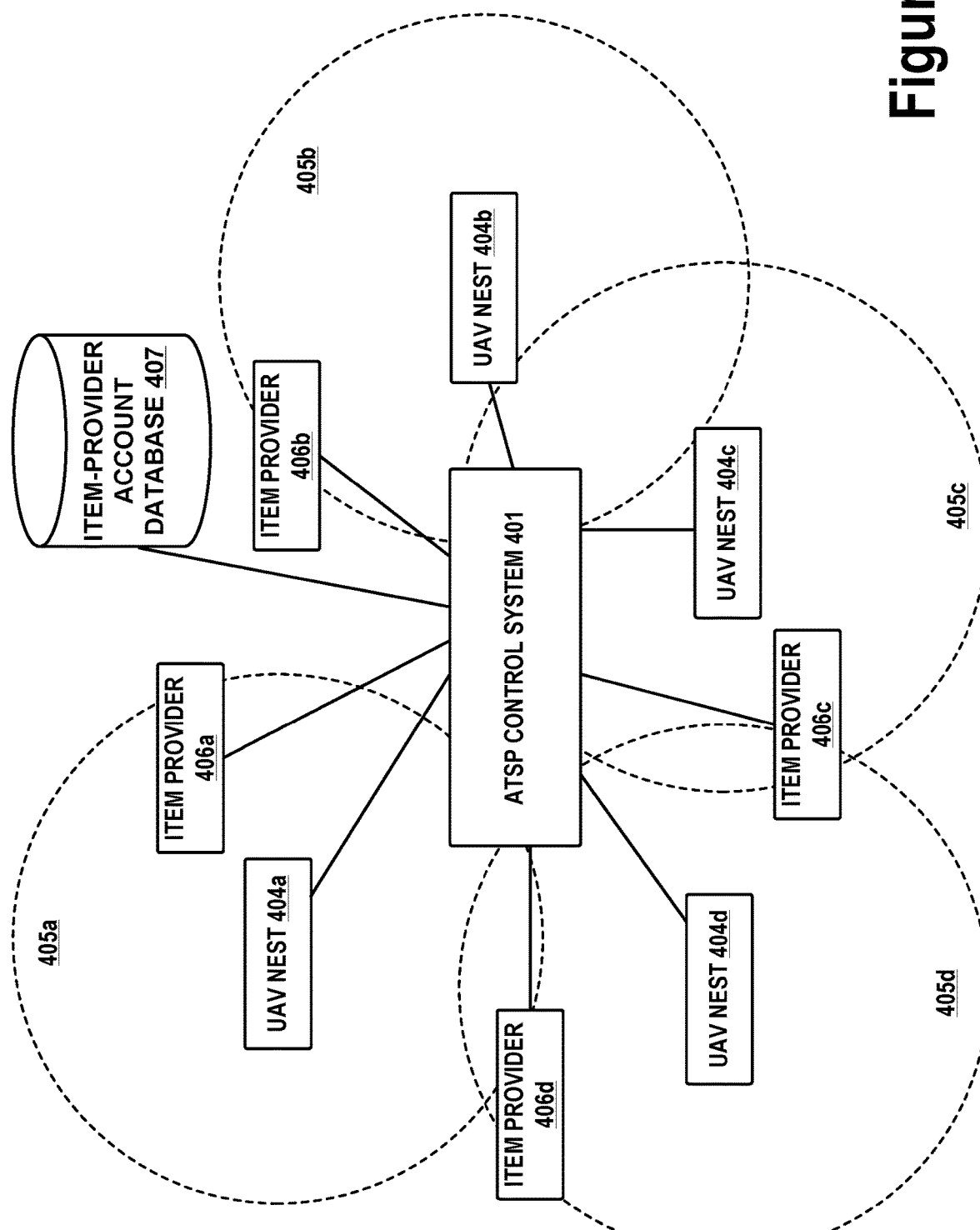
FIG. 4 is a block diagram showing an example arrangement for an aerial transport provider control system, in accordance with example embodiments.

FIG. 4 is a block diagram showing an example arrangement for an aerial transport service provider control system 401, which coordinates UAV transport services for a plurality of item providers that are located remotely from the service provider's central UAV dispatch locations (e.g., UAV nests). The ATSP may be a separate entity from the item providers. As shown, ATSP control system 401 may be communicatively coupled to computing or control systems of UAV nests 404a, 404b, 404c, and 404d (i.e., UAV nests 404a-d), and communicatively coupled to computing systems of item providers 406a, 406b, 406c, and 406d (i.e., item providers 406a-d). Such communicative couplings may be implemented using various types of wired and/or wireless communication protocols and networks.

Each of UAV nests 404a-d is a facility where UAVs can be stored for at least a short period of time, and from which UAVs can begin carrying out a UAV transport task (e.g., where UAVs can take off). In some implementations, some or all of the UAV nests may take the form of a local dispatch system and one or more deployment systems, such as those described in reference to FIG. 3 above. Of course, some or all of the UAV nests could also take other forms and/or perform different functions.

Each of the computing systems of item providers 406a-d may be associated with a different item provider account. As such, one or more of the computing systems associated with item providers 406a-d may include one or more computing devices that are authorized to access the corresponding item provider account with the ATSP. Further, the ATSP may store data for item provider accounts in an item provider account database 407.

In practice, one or more of the computing systems of item providers 406a-d may include one or more remote computing devices (e.g., such as one or more remote devices 306 described in reference to FIG. 3), which have logged in to or otherwise been authorized to access the same item provider account (e.g., cell phones, laptops, and/or computing devices of a business's employees). Additionally or alternatively, one or more of the computing systems of item providers 406a-d may be implemented with less of an ad-hoc approach; e.g., with one or more user-interface terminals installed at the item provider's facilities. Other types of item provider computing systems are also possible.

In order to provide UAV transport services to various item providers in an efficient and flexible manner, ATSP control system 401 may dynamically assign different UAVs to transport tasks for different item providers based on demand and/or other factors, rather than permanently assigning each UAV to a particular item provider. As such, the particular UAV or UAVs that carry out transport tasks for a given third-party item provider may vary over time.

The dynamic assignment of UAVs to flights for a number of different item providers can help an ATSP to more efficiently utilize a group of UAVs (e.g., by reducing unnecessary UAV downtime), as compared to an arrangement where specific UAVs are permanently assigned to specific item providers. More specifically, to dynamically assign UAVs to transport requests from third-party item providers, ATSP control system 401 can dynamically redistribute UAVs amongst a number of UAV deployment locations (which may be referred to as, e.g., "hubs" or "nests") through a service area, according to time-varying levels of demand at various locations or sub-areas within the service area.

Each respective UAV nest of UAV nests 404a-d is shown as having associated therewith a corresponding geographic area 405a, 405b, 405c, and 405d, respectively (i.e., geographic areas 405a-d), within which UAVs of the respective UAV nest provide transport services to item providers and/or item recipients. The geographic area served by a given UAV nest may be defined, at least in part, by the flight range(s) of the UAVs that are located at or scheduled to be located at the given UAV nest. In some implementations, the geographic areas 405a-d corresponding to UAV nests 404a-d may each have a fixed size, which does not vary over time. In other implementations, the size of each of geographic areas 405a-d could vary over time based on various factors, such as demand for UAV transport services in the geographic area and/or nearby geographic areas, the number and/or capabilities of UAVs allocated to operate from the corresponding UAV nest, and/or the number and/or characteristics of item providers located near to the UAV nest, among other possibilities.

Additionally or alternatively, the size of each of geographic areas 405a-d could vary on an order-by-order basis, and/or vary by item provider. More specifically, when a transport task involves three or more flight legs (e.g., a flight from the UAV nest to the item provider for pick-up, a flight from the item provider to a delivery location, and a return flight to the UAV nest), there may be two or more flight legs before delivering an item. Thus, the evaluation of whether or not a given item provider is within the geographic service area of a UAV nest for a given transport task may depend on a combination of the distance from the UAV nest to the item pick-up location, the distance from the pick-up location to the delivery location, and the distance from the delivery location to the UAV nest. As a result, a given UAV nest may be able to serve a given item provider for one transport task, but not for another. In this context, it is possible that the notion of a defined "geographic service area" might not be utilized at all. Instead, ATSP control system 401 may simply evaluate whether a UAV transport task can be implemented on a task-by-task basis, given all of the parameters for completion of the task.

Since certain item providers can only be served by (or are better served by) a certain UAV nest or nests, and because demand for UAV transport services can vary between item providers, ATSP control system 401 may, for a given geographic/service area, implement an ongoing process to distribute and redistribute UAVs amongst the UAV nests 404a-d that collectively serve the given area. In particular, ATSP control system 401 may continually, periodically, or from time-to-time evaluate demand and/or other factors for each item provider 406a-d, and determine a respective number of UAVs that are desirable at each of UAV nests 404a-d, in order to meet the demand for UAV transport tasks in the corresponding geographic area. Additionally or alternatively, ATSP control system 401 could determine a respective number of UAVs that are desirable at each of UAV nest 404a-d such that UAV nests 404a-d can collectively meet demand for UAV transport services in the larger area collectively served by the UAV nests 404a-d.

VI. EXAMPLE PAYLOAD PICK-UP OPERATIONS

FIGS. 5A, 5B, 5C, 5D, 5E, and 5F show UAV 500 that includes a winch system configured for pickup and drop-off of payloads, and which includes tether 502 coupled to spool 504, payload latch 506, and payload coupling apparatus 512. FIGS. 5A-5E show UAV 500 and the winch system being used to pick up payload 508. However, UAV 500 and the winch system may also be used to drop-off payload 508.

Payload latch 506 can function to secure payload 508 to UAV 500 during transport of payload 508. For instance, as shown, payload latch 506 may take the form of one or more pins that can engage payload coupling apparatus 512 (e.g., by sliding into one or more receiving slots in payload coupling apparatus 512). Inserting the pins of payload latch 506 into payload coupling apparatus 512 may secure payload coupling apparatus 512 within receptacle 514 on the underside of UAV 500, thereby preventing payload 508 from being lowered from UAV 500 and/or from moving (e.g. oscillating) with respect to UAV 500. In some embodiments, payload latch 506 may be arranged to engage spool 504 or payload 508 rather than payload coupling apparatus 512 in order to prevent payload 508 from lowering.

Spool 504 may be operated to unwind tether 502 to lower payload 508 from UAV 500 to the ground using tether 502 and payload coupling apparatus 512, or to wind tether 502 to lift payload 508 from the ground to UAV 500 using tether 502 and payload coupling apparatus 512. Payload 508 may be an item for transport from the pickup location to a delivery destination, and may be housed within (or otherwise incorporate) a parcel, container, or other structure that is configured to interface with payload coupling apparatus 512 and/or payload latch 506. The winch system of UAV 500 may operate to autonomously pick-up or drop-off payload 508 in a controlled manner while UAV 500 hovers above payload 508.

As shown in FIG. 5A, during flight from a launch site to target location 520 from which payload 508 is to be picked up, payload latch 506 may be in a closed position (e.g., pins engaging payload coupling apparatus 512) to hold payload coupling apparatus 512 against or close to the bottom of UAV 500, or even partially or completely inside UAV 500. Target location 520 may be a point in space above a desired pickup location. Then, when UAV 500 reaches target location 520, the UAV's control system (e.g., the tether control module 216 of FIG. 2) may toggle payload latch 506 to an open position (e.g., disengaging the pins from payload coupling apparatus 512), thereby allowing payload coupling apparatus 512 to be lowered from UAV 500 to pick up payload 508, as shown in FIG. 5B. Also, the control system may operate spool 504 (e.g., by controlling motor 222 of FIG. 2) such that payload coupling apparatus 512 is lowered to the ground.

Figure 5F:
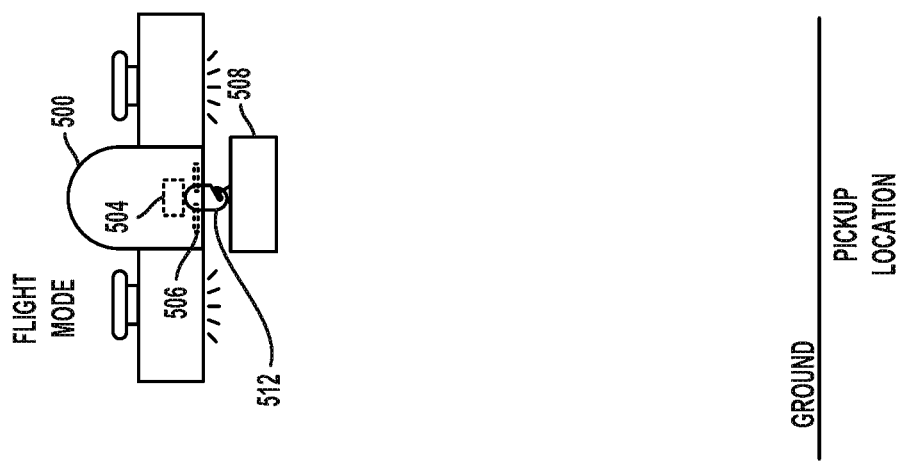

As payload coupling apparatus 512 is lowered toward payload 508, the control system may receive data from one or more sensors on UAV 500 or on payload coupling apparatus 512 to monitor the descent of payload coupling apparatus 512. The control system may, based on this sensor data, adjust a position of UAV 500 in coordination with the winch system to maneuver payload coupling apparatus 512 to within a threshold distance of payload 508 and mechanically couple payload 508 to tether 502 using payload coupling apparatus 512, as shown in FIGS. 5C and 5D. The position of UAV 500 may be adjusted while UAV 500 remains in hover mode, or alternatively, UAV 500 may be temporarily reverted to flight mode to perform the adjustments. Coordinating UAV 500 with the winch system may involve adjusting a vertical position of UAV 500, a horizontal position of UAV 500, and an extent to which tether 502 is unwound from spool 504 to guide payload coupling apparatus 512 to coincide with and thereby engage an attachment point on payload 508.

Within examples, the control system may use various types of data, and various techniques, to determine where payload coupling apparatus 512 is positioned in relation to the ground or to UAV 500. The data may include, for example, sensor data from one or more perception sensors on UAV 500 (e.g., time-of-flight camera, stereo camera, light detection and ranging device, RADAR, etc.). In some embodiments, the data may be data from an encoder indicative of rotation of spool 504. Based on data from the encoder, the control system may determine how many rotations spool 504 has undergone and, based on the number of rotations, determine a length of tether 502 that is unwound from spool 504 (e.g., by multiplying the number of rotations of spool 504 by the circumference of tether 502 wrapped around spool 504). In some embodiments, the circumference of tether 502 on spool 504 may vary as tether 502 winds or unwinds from spool 504, and so the control system may be configured to account for these variations when determining the unwound tether length.

Figure 5E:
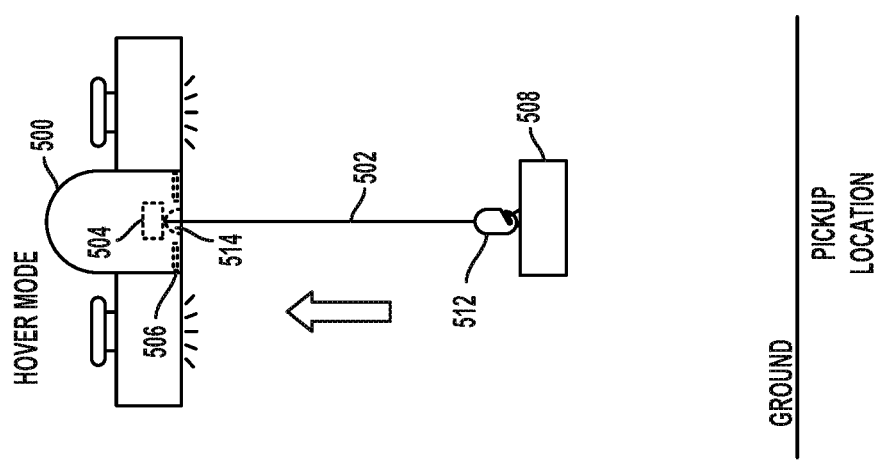
Figure 5D:
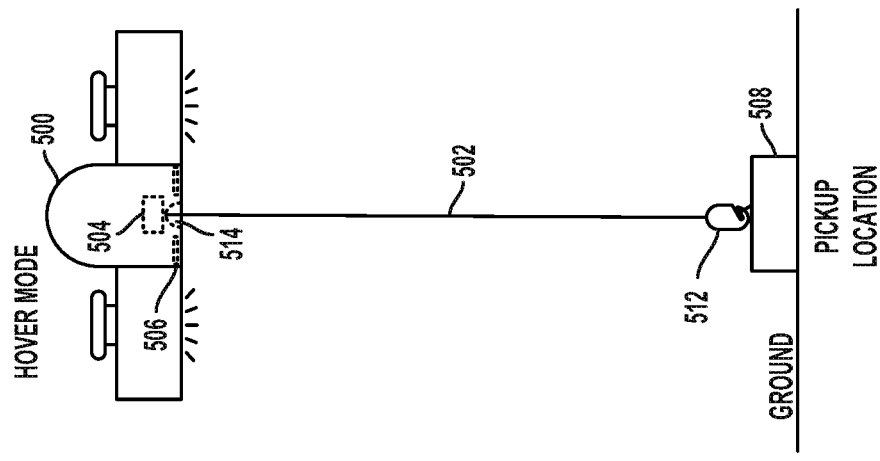

After attaching payload coupling apparatus 512 to payload 508, the control system may operate spool 504 to retract tether 502, payload coupling apparatus 512, and payload 508 toward UAV 500, as shown in FIG. 5E. Once payload coupling apparatus 512 reaches or nears UAV 500, the control system may operate spool 504 to pull payload coupling apparatus 512 into receptacle 514, and the control system may toggle payload latch 506 to the closed position, as shown in FIG. 5F. UAV 500 may then return to flight mode and proceed to deliver payload 508 to its target destination.

Referring back to FIG. 5C, in order to mechanically couple tether 502 to payload 508 using payload coupling apparatus 512, the control system of UAV 500 may determine a trajectory through which to move payload coupling apparatus 512 to guide it onto or into the attachment point on payload 508. Notably, in addition to physically coinciding with the attachment point on payload 508, payload coupling apparatus 512 may, in some implementations, need to be oriented in a specific way in order to engage with the attachment point on payload 508. For example, as shown, when payload coupling apparatus 512 is a hook or a hook-like device, the opening of the hook may need to face the attachment point (e.g., handle) on payload 508 to engage therewith. The trajectory may therefore define a path in space for payload coupling apparatus 512 to travel, as well as orientations of payload coupling apparatus 512 along that path. The path in space may be defined in one, two, or three dimensions, depending on the implementation.

The process of determining the trajectory may be based on and facilitated by one or more visual marking on payload coupling apparatus 512 and on payload 508. Markings on payload 508 may help the control system identify the location of the payload and the attachment point thereon, while markings on payload coupling apparatus 512 may assist in localizing payload coupling apparatus 512 relative to payload 508. The markings may be designed such that when the markings on payload coupling apparatus 512 become aligned with the markings on payload 508, as viewed from the perspective of one or more sensors on UAV 500, payload coupling apparatus 512 will be aligned with the attachment point on payload 508 so as to be successfully coupled thereto.

The control system may control a position and orientation of UAV 500, in coordination with spool 504, to move payload coupling apparatus 512 along the determined trajectory. The control system may include, for example, a proportional-integral-derivative (PID) controller that adjusts a position of UAV 500 based on a difference between an actual position of payload coupling apparatus 512 and a position indicated by the trajectory, a derivative of this difference, and an integral of this difference.

As UAV 500 is repositioned, there may be a delay between motion of UAV 500 and when this motion is transferred to payload coupling apparatus 512. This delay may depend on the unwound length of tether 502 and may cause payload coupling apparatus 512 to oscillate with respect to UAV 500, as indicated by arrow 516, if the position of UAV 500 is abruptly adjusted. Accordingly, as payload coupling apparatus 512 nears the end of the trajectory toward the attachment point on payload 508, a rate at which the position of UAV 500 is adjusted may be reduced to suppress oscillations and minimize or reduce a difference between an actual position of payload coupling apparatus 512 and a target position indicated by the trajectory. Reducing the rate at which position of UAV 500 is adjusted may include limiting UAV 500 to move with a maximum velocity and a maximum acceleration, and/or adjusting gain values of the PID controller to produce more gradual adjustments in the position of UAV 500.

In some instances, oscillations of payload coupling apparatus 512 may make it difficult to accurately control payload coupling apparatus 512 to guide it onto the attachment on payload 508. For example, oscillations may be difficult to avoid, suppress, or control when a long length of tether 502 is unwound to reach payload 508 (i.e., when UAV 500 hovers high above payload 508), or when wind pushes payload coupling apparatus 512 around in an unpredictable manner. In other instances, adjusting the position of UAV 500 slowly enough to avoid oscillations and accurately guide payload coupling apparatus 512 onto the attachment point on payload 508 may take a long time (e.g., more than a threshold amount of time such as 10, 20, or 30 seconds). Keeping the payload coupling apparatus 512 and UAV 500 close to the ground for more than the threshold amount of time may be risky and therefore undesirable (e.g., due to increased potential for collision between UAV 500 or payload coupling apparatus 512 and objects near the ground).

Therefore, in addition to or instead of adjusting position of UAV 500 to guide payload coupling apparatus 512 onto the attachment point on payload 508, UAV 500 may utilize a repositioning device configured to reposition payload coupling apparatus 512 in at least a horizontal direction. The repositioning device may allow for more accurate control over the horizontal position of payload coupling apparatus 512 than could be achieved by repositioning UAV 500 to steer payload coupling apparatus 512 connected thereto via tether 502.

VII. EXAMPLE DEVICES FOR REPOSITIONING THE PAYLOAD COUPLING APPARATUS

Figure 6A:
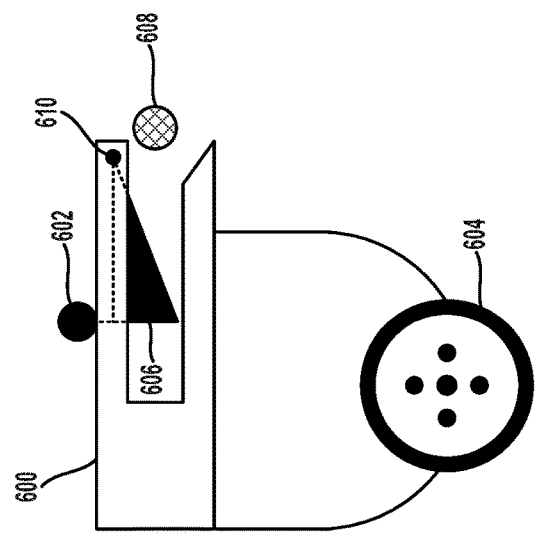
FIGS. 6A, 6B, and 6C illustrate a payload coupling apparatus with wheels, in accordance with example embodiments.
Figure 6B:
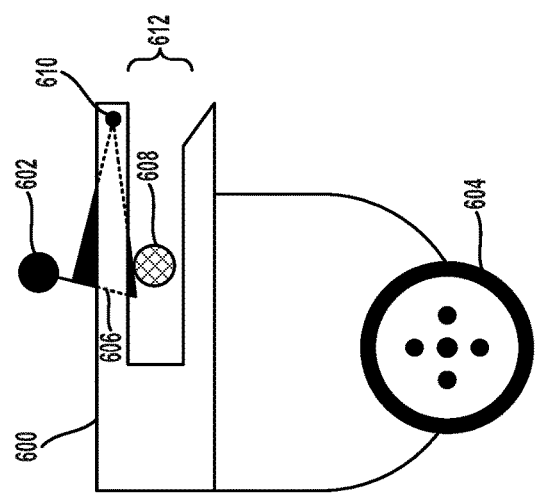
Figure 6C:
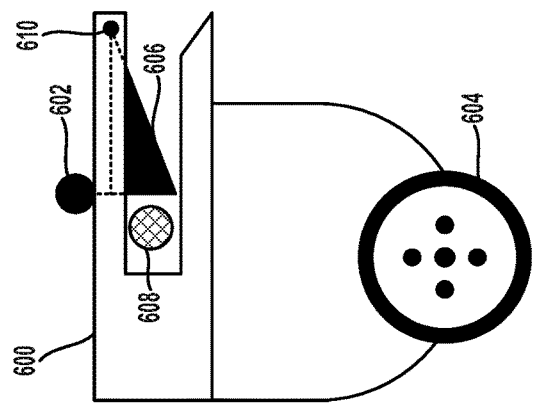

FIGS. 6A, 6B, and 6C illustrate an example implementation of a repositioning device for a payload coupling apparatus. Namely, FIGS. 6A-6C illustrate payload coupling apparatus 600 having wheels 604 (one on each side, with only one wheel shown in the side views) and a self-latching mechanism for connecting to attachment point 608 (of which only a cross-section is shown) of a payload. Each wheel may be driven by a corresponding motor to allow payload coupling apparatus 600 to move about the environment. The self-latching mechanism includes aperture or opening 612, body 606, stopper 602 for limiting a range of motion of body 606, and pivot 610 about which body 606 pivots. Attachment point 608 may be part of a handle or other mating mechanism configured to be mechanically coupled with the self-latching mechanism.

Rather than having the UAV steer payload coupling apparatus 600 onto attachment point 608 while payload coupling apparatus 600 is in mid-air, payload coupling apparatus 600 may be set down on the ground and wheels 604, which may constitute the repositioning device or apparatus, may be used to drive payload coupling apparatus 600 toward the payload to engage attachment point 608 using the latching mechanism. As payload coupling apparatus 600 is driven toward attachment point 608, attachment point 608 may push against body 606, as shown in FIG. 6B, causing body 606 to pivot out of the way about pivot 610. When payload coupling apparatus 600 is driven sufficiently close to the payload, as shown in FIG. 6C, body 606 may drop back down, latching attachment point 608 to payload coupling apparatus 600. In some implementations, the latching mechanism may be passive (i.e., non-actuated). Alternatively, the latching mechanism may be active (i.e., actuated), allowing the control system to selectively close and open the latch to engage and disengage payloads.

Figure 7A:
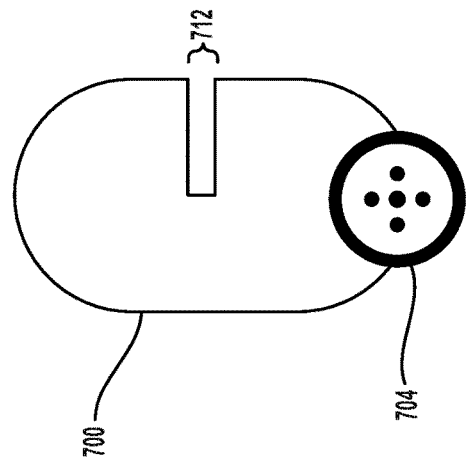
FIGS. 7A and 7B illustrate another payload coupling apparatus with wheels, in accordance with example embodiments.
Figure 7B:
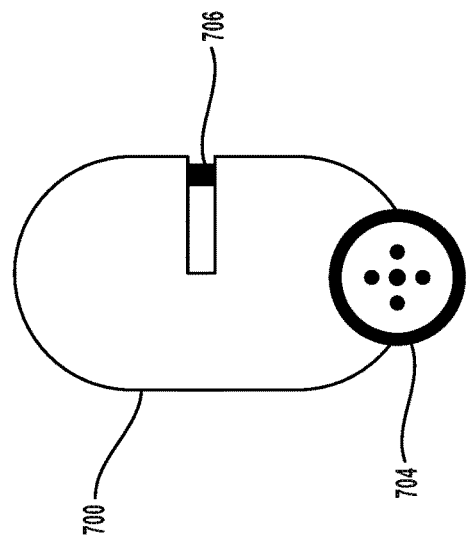

FIGS. 7A and 7B illustrate an alternative implementation of a payload coupling apparatus. Namely, payload coupling apparatus 700 may have wheels 704, driven by corresponding motors, onto which payload coupling apparatus may be set down on the ground and which may be used to reposition payload coupling apparatus 700 within the environment. Payload coupling apparatus 700 may include aperture or opening 712 and lock 706 operable between a closed position, as shown in FIG. 7B, and an open position, as shown in FIG. 7A. Lock 706 may be actuated and may thus be controllable by the control system to engage and disengage payloads from payload coupling apparatus 700. In some implementations, the shape, size, and other design aspects of the payload coupling apparatus, as well as the design or type of the latching or locking mechanism, may vary from those shown in FIGS. 6A-7B (e.g., based on the design of the handle or mating mechanism on the payload to which the payload coupling apparatus is to be coupled) without departing from the scope of this disclosure.

Figure 8B:
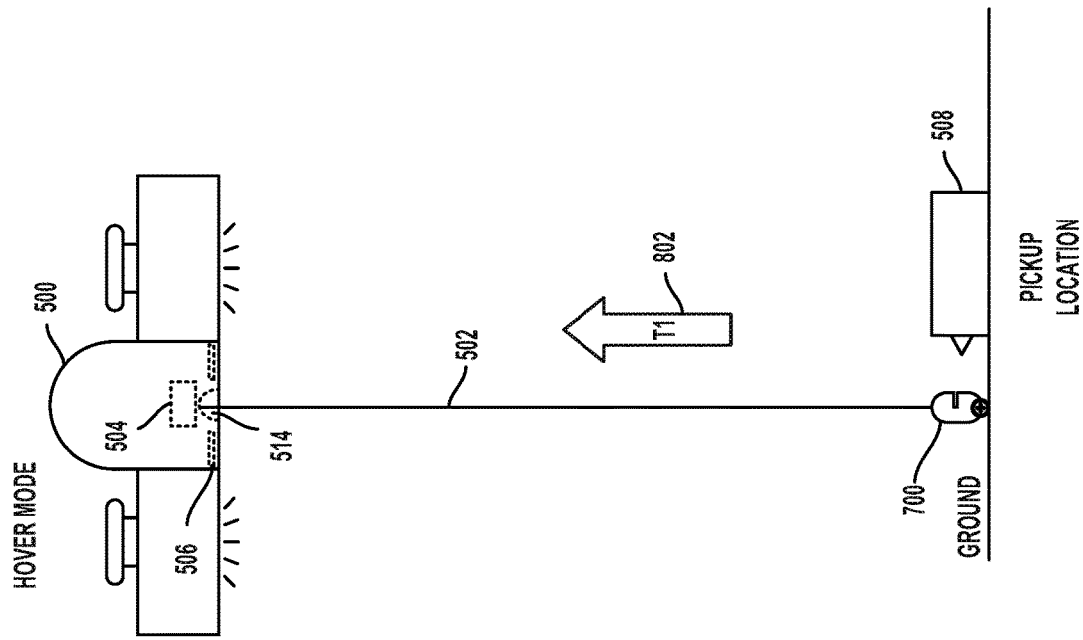
FIGS. 8A, 8B, 8C, 8D, and 8E illustrate a payload coupling apparatus with wheels being used to engage a payload, in accordance with example embodiments.
Figure 8A:
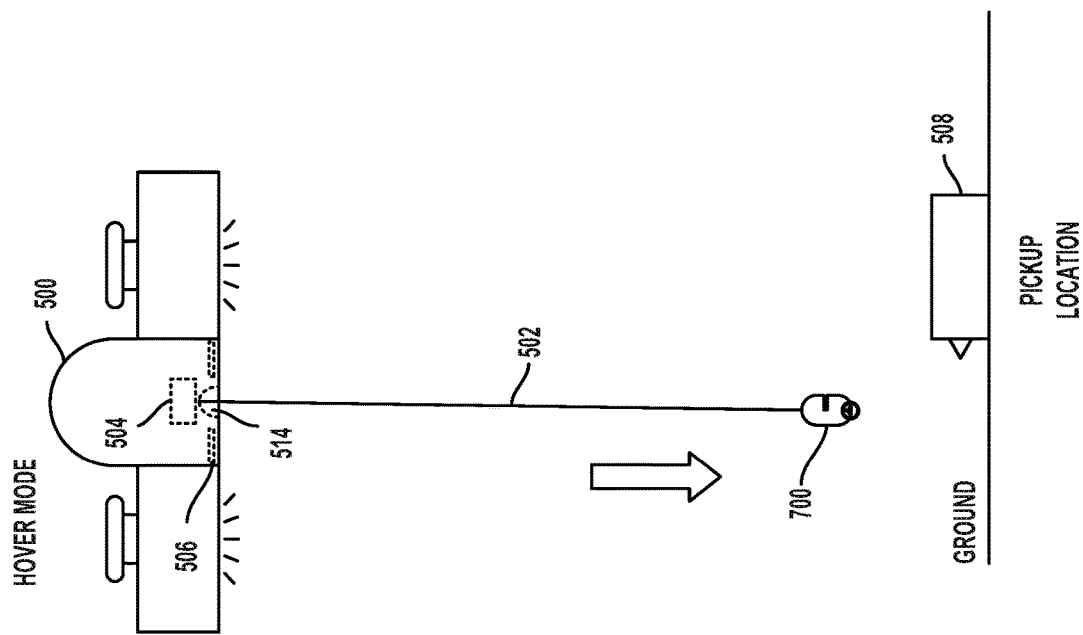

FIGS. 8A, 8B, 8C, 8D, and 8E illustrate payload coupling apparatus 700, having a repositioning device in the form of wheels 704, used to couple payload 508 to tether 502. First, the control system may cause UAV to hover above payload 508 and deploy payload coupling apparatus 700 by unwinding tether 502 from spool 504, as shown in FIG. 8A. This may involve controlling the position of UAV 500 in coordination with the winch system to maneuver payload coupling apparatus 700 to within a threshold distance (e.g., several inches or feet) of the payload so that payload coupling apparatus 700 does not have to traverse more than the threshold distance to reach payload 508, thus speeding up the payload engagement procedure. Notably, by setting payload coupling apparatus 700 on the ground to perform payload pickup, oscillation of payload coupling apparatus 700 may be reduced, minimized, or eliminated. In some implementations, the attachment point may be on top of payload 508 and payload coupling apparatus 700 may thus be set down atop payload 508 to reach the attachment point.

When payload coupling apparatus 700 is maneuvered to within the threshold distance of payload 508 and is set down on the ground, as shown in FIG. 8B, UAV 500 may be caused to hover in a fixed or approximately fixed location (e.g., within several centimeters of a set location) above payload 508 to maintain payload coupling apparatus 700 within the threshold distance of the payload. That is, a position of UAV 500 may be fixed in space so as not to inadvertently reposition payload coupling apparatus 700 with respect to payload 508, allowing payload coupling apparatus 700 to be repositioned with respect to payload 508 using wheels 704. Hovering in the fixed location may involve entering a "Fixed-Position Hover Mode," which may be a subset of the "Hover Mode" or a separate mode altogether.

Notably, hovering UAV 500 in the fixed position and relying on wheels 704 to horizontally reposition payload coupling apparatus 700 may simplify the process of mechanically coupling payload 508 to tether 502. Controlling the position of payload coupling apparatus 700 by repositioning UAV 500 may, under some conditions, be difficult and inaccurate because movements of UAV 500 may, due to tether 502, induce movements in payload coupling apparatus 700 with a delay. That is, a horizontal position of payload coupling apparatus 700 might not change immediately after UAV 500 is repositioned horizontally due to the compliance of tether 502. Wheels 704, however, induce movements in payload coupling apparatus 700 directly, without any delay due to tether 502. That is, by situating the repositioning apparatus closer to payload coupling apparatus 700, the delay can be reduced or eliminated, and the horizontal position of payload coupling apparatus 700 can therefore be controlled more accurately than by repositioning UAV 500. Nevertheless, the repositioning devices and the operations thereof may be used in combination with repositioning of UAV 500 to control the horizontal position of the payload coupling apparatus.

The control system may control spool 504 to maintain tension 802 on tether 502. The magnitude of this tension (e.g., T1) may be such that tether 502 remains taut (i.e., does not slack to the ground) and wheels 704 of payload coupling apparatus 700 remain on the ground, allowing payload coupling apparatus 700 to be repositioned, as shown in close-up in FIGS. 8C and 8D. Keeping tether 502 off the ground while payload coupling apparatus 700 is driven thereon may prevent tether 502 from becoming an obstacle to (e.g., tangling with) payload coupling apparatus 700. The magnitude of tension 802 may be adjusted (e.g., from T1 to T2) as payload coupling apparatus 700 is repositioned to move toward payload 508.

In implementations where payload coupling apparatus 700 uses only two wheels, tension on tether 502 may also operate to keep payload coupling apparatus 700 upright on the two wheels, thus preventing payload coupling apparatus 700 from tipping over and potentially losing traction. Notably, using tension on tether 502 to balance payload coupling apparatus 700 as it moves through the environment allows payload coupling apparatus 700 to remain balanced without using additional motors, sensors, and control operations for such motors, thereby reducing cost and complexity.

In some implementations, however, tether 502 may be allowed to go slack and/or fall to the ground. Payload coupling apparatus 700 may be configured to use wheels 704 to drive over or around the portion of tether 502 that rests on the ground. Additionally, payload coupling apparatus 700 may be kept balanced over wheels 704 in other ways. For example, payload coupling apparatus 700 may include three or more wheels such that it remains inherently balanced over the wheels. In another example, payload coupling apparatus 700 may include therein one or more gyroscopes or IMUs. Data from the gyroscopes or IMUs may be used to control the motors that drive wheels 704 so as to keep payload coupling apparatus balanced over wheels 704.

After payload coupling apparatus 700 is set down on the ground, wheels 704 may be driven to move payload coupling apparatus 700 toward attachment point 800 on payload 508. Attachment point 800 may be a handle or other mating mechanism configured to interface or couple with payload coupling apparatus 700. In some instances, a type of payload coupling apparatus used by UAV 500 may depend on a type of attachment point on the payload that UAV 500 is planned to transport. That is, the payload coupling apparatus may be selected or swapped before the UAV is deployed based on the type of payload attachment point on the payloads that the UAV is planned to transport.

The trajectory along which payload coupling apparatus 700 moves may be determined based on sensor data from one or more sensors on UAV 500 or on payload coupling apparatus 700. For example, in some implementation, the control system of UAV 500 may, based on sensor data from sensors on UAV 500 and/or sensors on payload coupling apparatus 700, determine the trajectory and provide control inputs to cause wheels 704 to follow the trajectory. In other implementations, after UAV 500 sets payload coupling apparatus 700 down on the ground, a control system of payload coupling apparatus 700, independently of the control system of UAV 500 and implemented, for example, on payload coupling apparatus 700, may autonomously control wheels 704 to move payload coupling apparatus toward the attachment point on payload 508. That is, payload coupling apparatus 700 may, after being set down on the ground, operate as a separate autonomous vehicle to identify payload 508, identify the attachment point thereon, and move toward the attachment point to couple itself to payload 508.

Figure 8C:
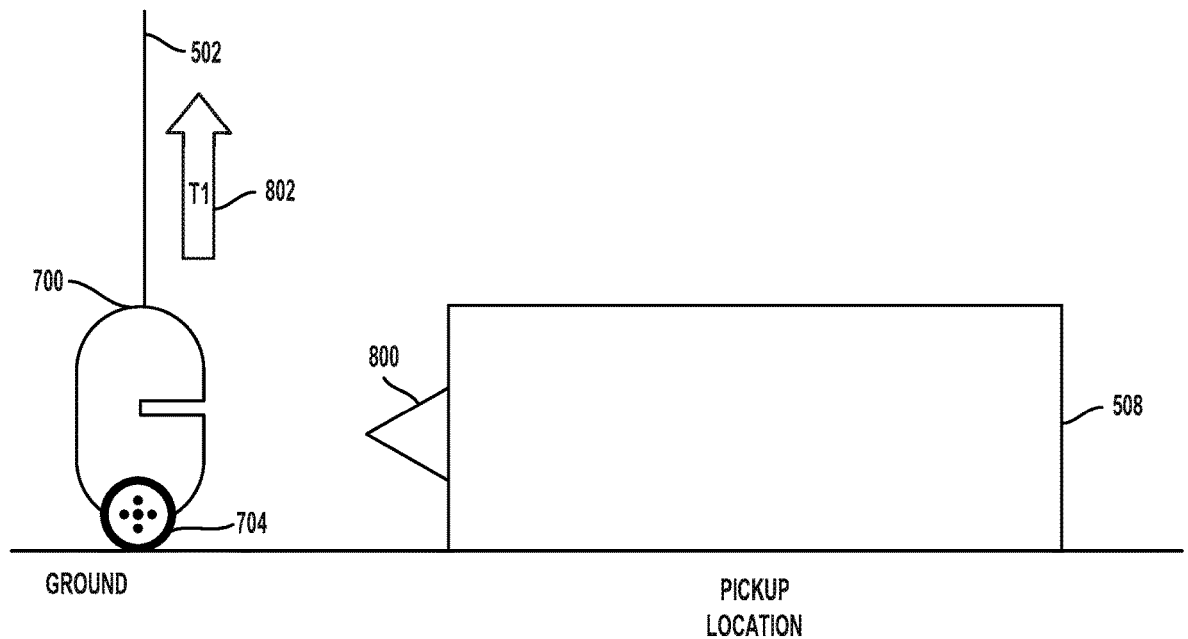
Figure 8D:
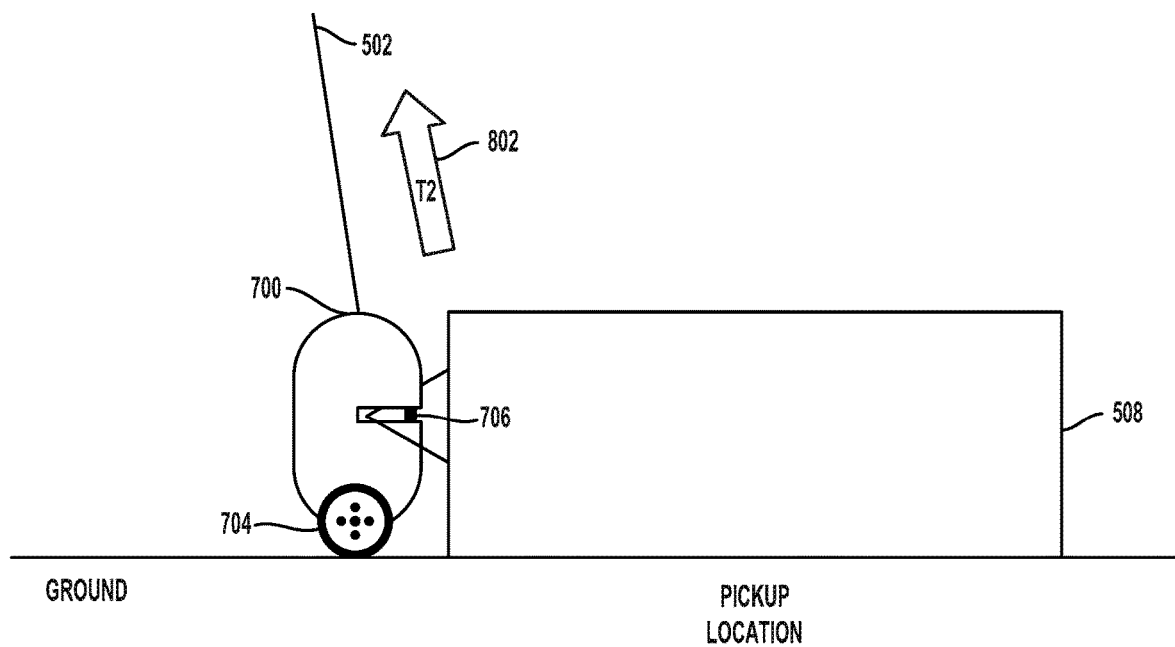
Figure 8E:
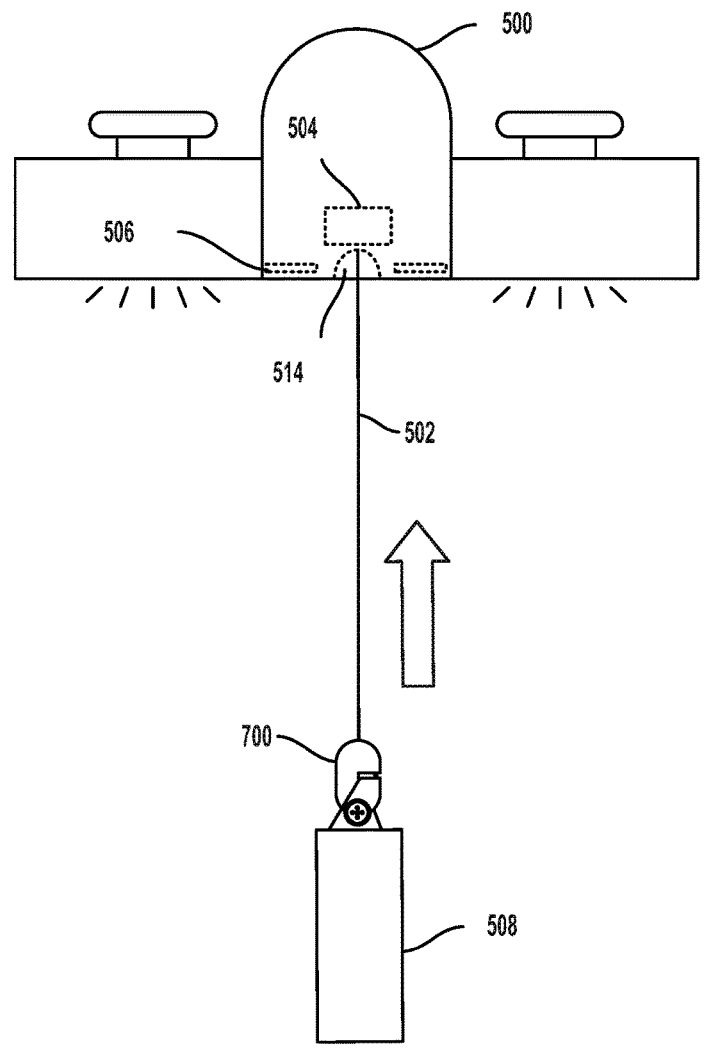

Payload coupling apparatus 700 may mechanically attach itself to attachment point 800 on payload 508 using lock 706, as shown in FIGS. 8D and 8E. Thereafter, spool 504 may be actuated to retract tether 502 and lift payload 508. Once payload coupling apparatus 700 is retracted into receptacle 514, UAV 500 may enter flight mode and may proceed to deliver payload 508 to its destination.

FIGS. 9A, 9B, 9C, and 9D illustrate another example repositioning device for controlling the horizontal position of payload coupling apparatus 512. Namely, the horizontal position of payload coupling apparatus 512 relative to UAV 500 may be controlled using a robotic arm connected to UAV 500. The arm may include barrel (or body) 900, rod 902, and guide 904. Body 900 may be rotatable or pivotable with respect to UAV 500, rod 902 may be retractable and extendable with respect to body 900, and guide 904 may be pivotable relative to rod 902. The arm may thus be adjustable to push or pull on tether 502 extending through tether guide 904 to control a horizontal position of payload coupling apparatus 512, and, to some extent, the vertical position as well. In alternative implementations, the arm may include additional articulations and degrees of freedom to allow for more complex repositioning operations of payload coupling apparatus 512 relative to UAV 500.

Figure 9B:
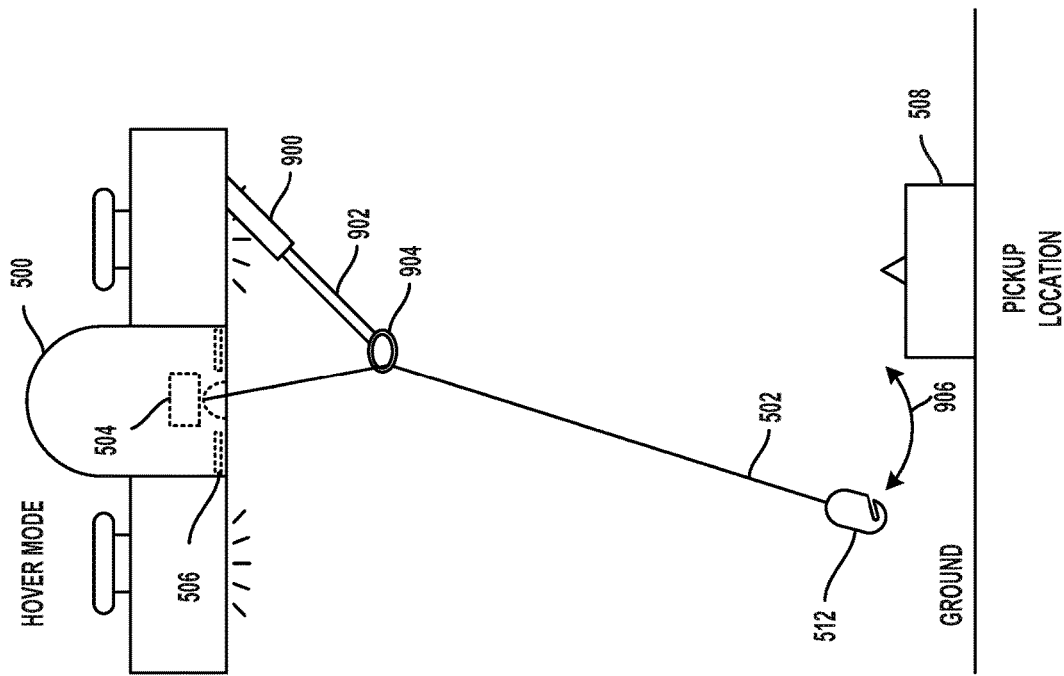
FIGS. 9A, 9B, 9C, and 9D illustrate a robotic arm being used to reposition a payload coupling apparatus, in accordance with example embodiments.
Figure 9A:
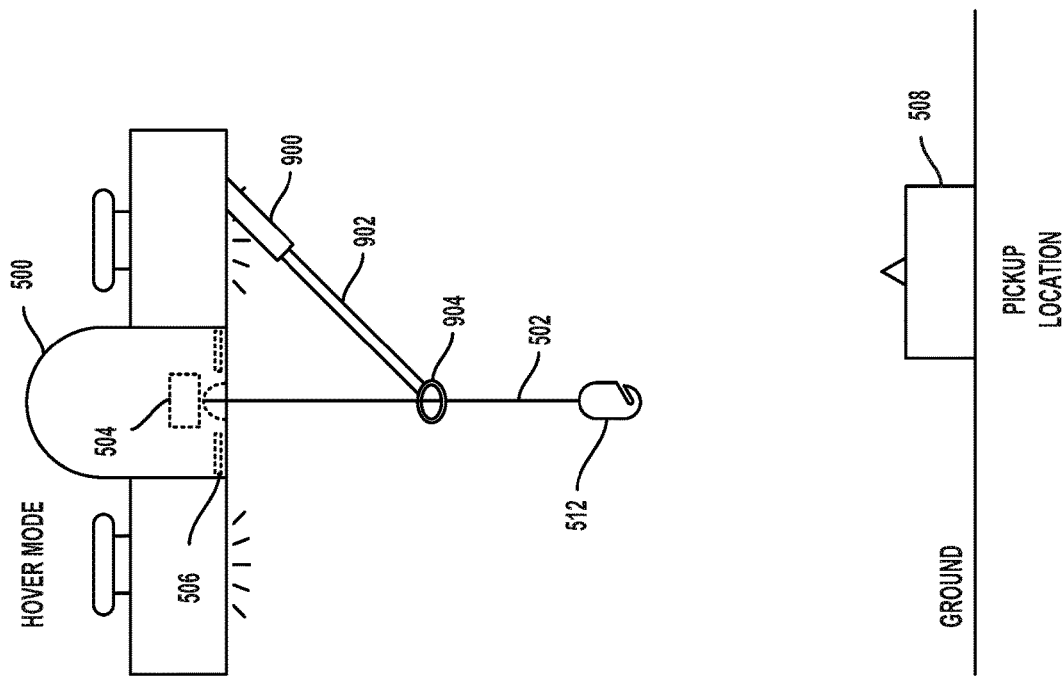

Similarly to FIGS. 8A-8E, upon arriving at the pick up location of payload 508, UAV 500 may deploy payload coupling apparatus 512 by unspooling tether 502 from spool 504 and repositioning itself, in coordination with the unspooling, to guide payload coupling apparatus 512 to within the threshold distance of payload 508, as shown in FIG. 9A. Additionally, body 900, rod 902, and guide 904 of the repositioning arm may be extended from a resting position (e.g., as shown in FIG. 9D) to allow tether 502 to extend down through guide 904. Guiding payload coupling apparatus 512 to within the threshold distance may involve guiding payload coupling apparatus 512 to a fixed vertical height and to a fixed horizontal distance away from the attachment point on payload 508. The vertical height and horizontal distance may be such that, when the repositioning arm pushes tether 502 to the side, as shown in FIG. 9B, payload coupling apparatus 512 will swing along an arc, as indicated by arrow 906, to engage the attachment point on payload 508. In some implementations, as arm pushes or pulls on tether 502, additional length of tether may be unspooled to allow payload coupling apparatus 512 to travel horizontally along a line, rather than an arc.

Once payload coupling apparatus 512 is brought to within the threshold distance of payload 508, UAV 500 may be locked into a fixed position such that it does not produce movements that would inadvertently induce oscillations in payload coupling apparatus 700. Although wind, variations in air density, and other ambient conditions may operate to perturb UAV 500, the control system may operate to counteract such perturbations and maintain UAV 500 as close to the fixed position as possible. With UAV 500 in the fixed position, the positioning arm may be used to pull tether 502 towards the right, causing payload coupling apparatus 512 to swing towards payload 508 and connect to the attachment point thereon, as shown in FIGS. 8B and 8C. Body 900 may be pivoted relative to UAV 500, rod 902 may be retracted into body 900, and guide 904 may be pivoted relative to rod 902 to produce the desired movement of payload coupling apparatus 512. In some instances, spool 504 may be operated to unspool an additional length of tether 502 to allow payload coupling apparatus 512 to coincide with the attachment point on payload 508.

Notably, the positioning arm may allow for more accurate control over the horizontal position of payload coupling apparatus 512 than could be achieved via repositioning of UAV 500 because the repositioning arm pushes or pulls on tether 502 at a point closer to payload coupling apparatus 512. That is, the motion of the repositioning arm is transferred to payload coupling apparatus along a shorter effective length of tether 502 than motion of UAV 500, thus allowing for more direct control over payload coupling apparatus 512. Additionally, as the position of UAV 500 varies around the fixed position due to various sources of perturbation, the vertical height of payload coupling apparatus 512 and the extent to which the positioning arm pulls on tether 502 may be adjusted to compensate for the variations in position of UAV 500 so as to control payload coupling apparatus 512 to coincide with the attachment point on payload 508.

Figure 9C:
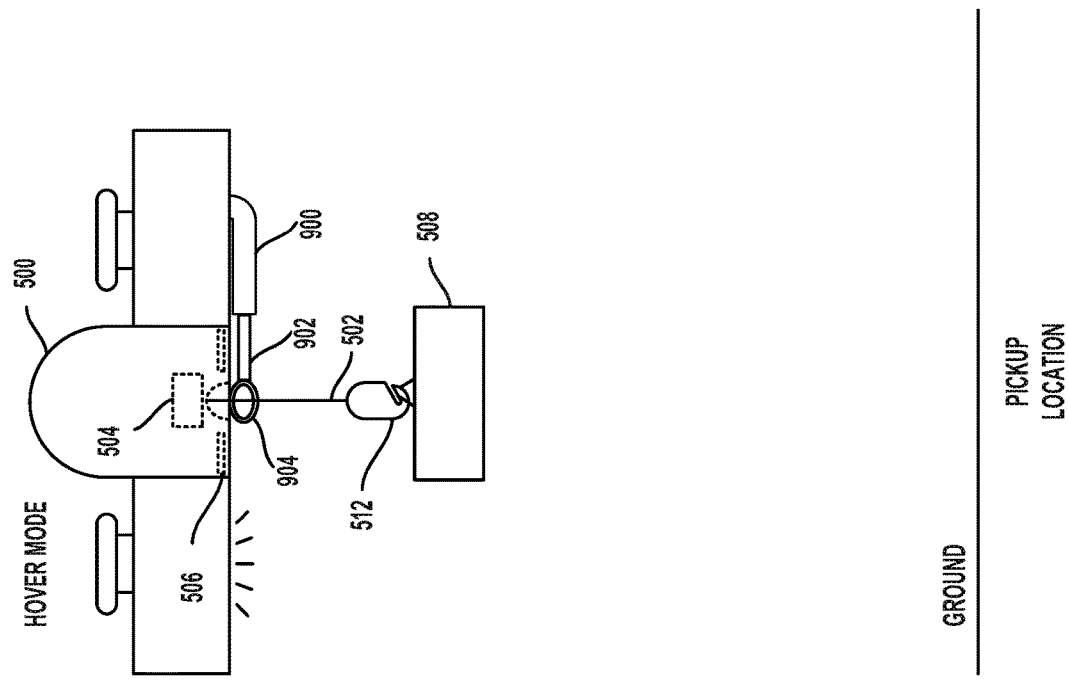
Figure 9D:
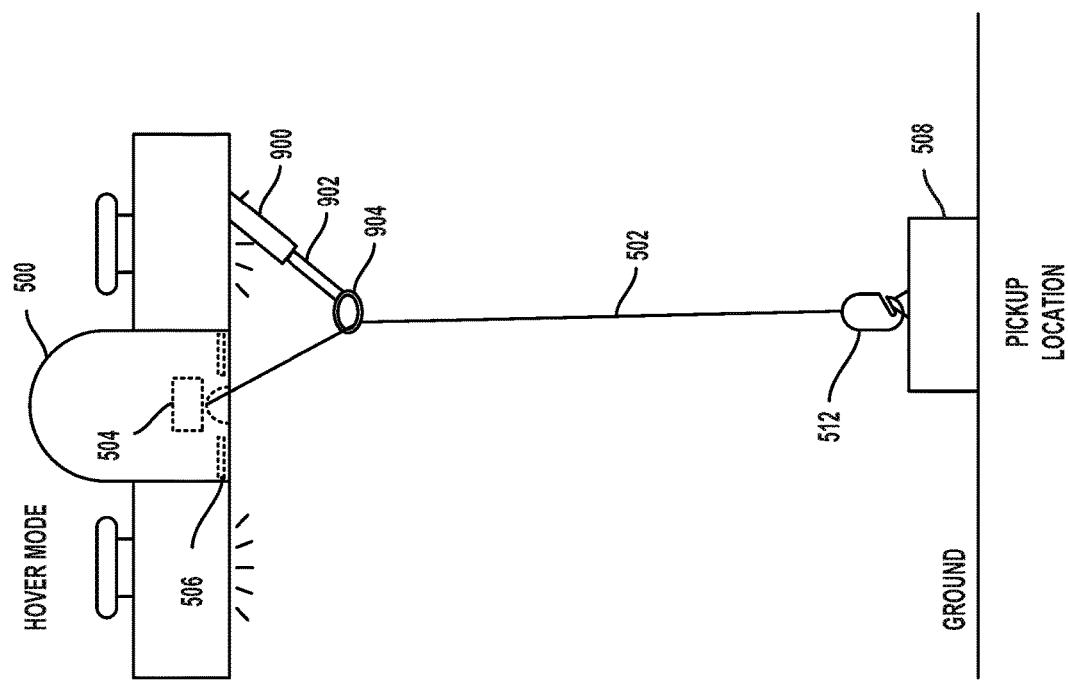

When payload coupling apparatus 512 engages with the attachment point on payload 508, as shown in FIGS. 9C and 9D, spool 504 may be actuated to retract tether 502, thus hooking and lifting payload 508 off the ground. The repositioning arm may also be retracted or folded into a more compact form, as shown in FIG. 9D, so as not to generate additional drag during transport. Payload 508 and payload coupling apparatus 512 may be secured to UAV 500, as previously described, and UAV 500 may proceed to transport payload 508 to its destination.

Figure 10:
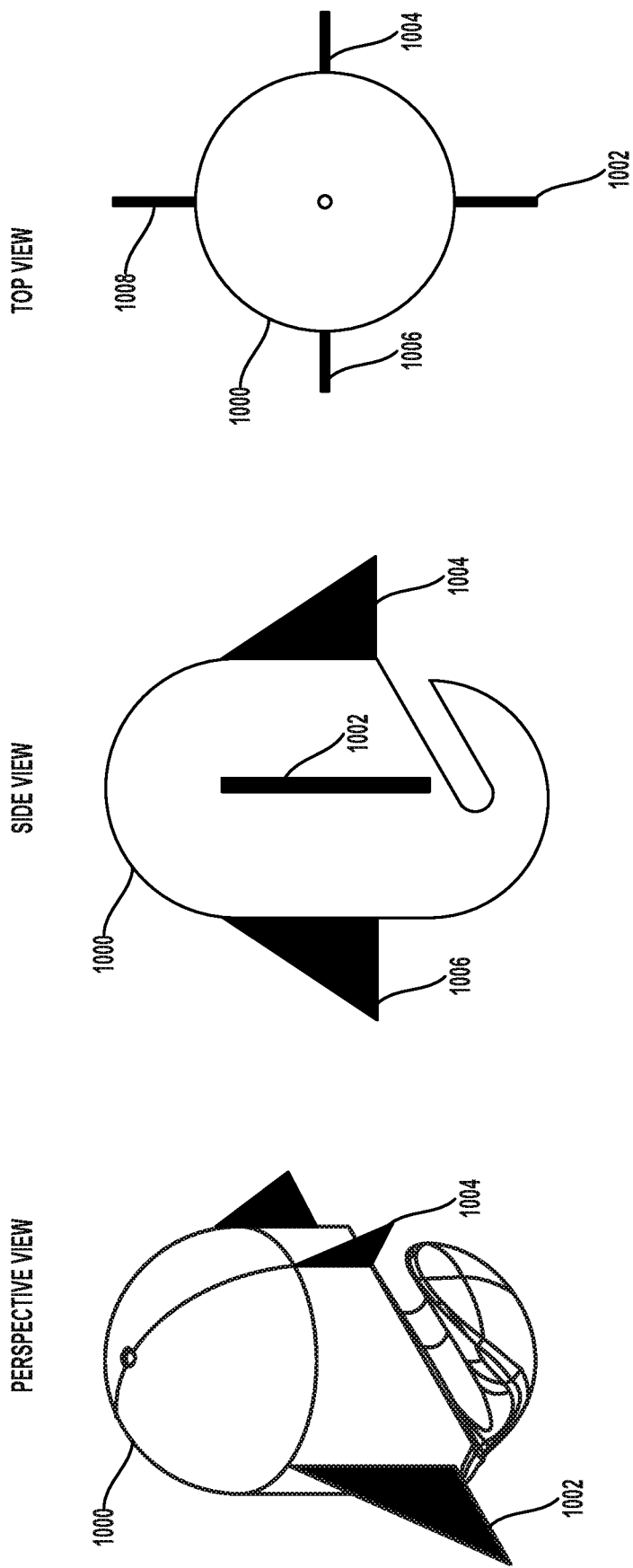
FIG. 10 illustrates a payload coupling apparatus with fins, in accordance with example embodiments.

FIG. 10 illustrates a perspective view, a side view, and a top view of an additional implementation of a repositioning device. Namely, FIG. 10 illustrates payload coupling apparatus 1000 equipped with a plurality of adjustable fins or airfoils 1002, 1004, 1006, and 1008, which constitute the repositioning device or apparatus. Due to the hook recess or opening on payload coupling apparatus 1000, fins 1004 and 1006 may be smaller than fins 1002 and 1008. Alternatively, in other implementations, fins 1002-1008 may be uniformly sized, and/or may include different shapes, aerodynamic features, and design aspects than shown in FIG. 10. Since payload coupling apparatus 1000 is positioned below UAV 500 during pickup and drop-off, a downwash of air from rotors or propellers of UAV 500 flows over fins 1002-1008. Thus, by repositioning fins 1002-1008, the downwash may be used to generate a force on payload coupling apparatus 1000 to steer it in a desired direction.

Figure 11:
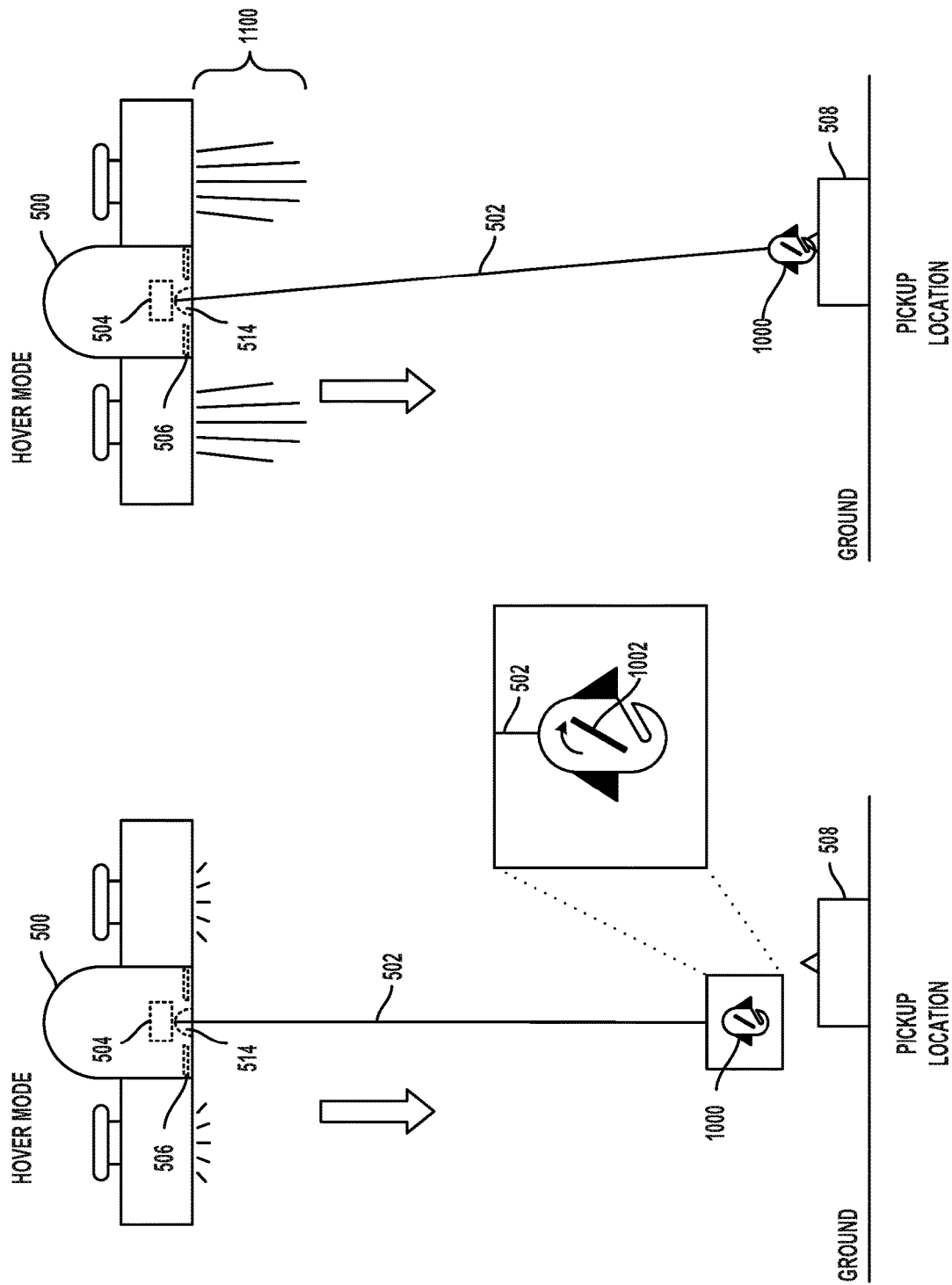
FIGS. 11A and 11B illustrate fins on a payload coupling apparatus being used to reposition the payload coupling apparatus, in accordance with example embodiments.

FIGS. 11A and 11B illustrate how fins 1002-1008 on payload coupling apparatus 1000 may be used to control payload coupling apparatus 1000 to mechanically couple it to the attachment point on payload 508. As previously described, upon arriving at the pickup location, UAV 500 may deploy tether 502 and, by synchronizing the position of UAV 500 with deployment of tether 502, bring payload coupling apparatus 1000 to within the threshold distance of payload 508. The position of UAV 500 may then be fixed, and fins 1002-1008 may be used to guide payload coupling apparatus 1000 onto the attachment point of payload 508. In some implementations, fins 1002-1008 may be repeatedly adjusted while payload coupling apparatus 1000 is being lower to reduce or eliminate oscillations of payload coupling apparatus 1000.

A close-up view in FIG. 11A illustrates fin 1002 turned in a clockwise direction to generate, on payload coupling apparatus 1000, a force directed towards the right (fin 1008, not shown, may be similarly adjusted to prevent payload coupling apparatus 1000 from rotating about an axis defined by tether 502). Fins 1004 and 1006 may be used to control the orientation of payload coupling apparatus 1000 so that the opening of the hook thereon engages the attachment point on payload 508, resulting in a mechanical coupling or attachment, as shown in FIG. 11B. The positioning, reorienting, and stabilizing forces may be generated by taking advantage of downwash 1100 (shown enlarged for emphasis) of UAV 500.

As with the preceding examples, once payload 508 is coupled to tether 502 by the payload coupling apparatus 512, the winch may be operated to lift payload 508 and secure it to the underside of UAV 500 for transport. Further, in some implementations, fins 1002-1008 may be used to control the horizontal position of payload coupling apparatus 1000 in coordination with movements of UAV 500. In one example, fins 1002-1008 may be adjusted to account or compensate for movements performed by UAV 500 to remain in the fixed position above payload 508.

In another example, fins 1002-1008 may be adjusted in coordination with movements of UAV 500 which are intended to actively reposition payload coupling apparatus 1000. In order to move payload coupling apparatus 1000 to engage payload 508, the control system may determine a trajectory or path for the payload coupling apparatus to follow. A first component of motion along this trajectory may be assigned to be induced by UAV 500, and a second component of motion along this trajectory may be assigned to be induced by fins 1002-1008. For example, the first and second components may each be a distance along the horizontal direction. Since UAV 500 is capable of making larger, albeit less accurate, adjustments than fins 1002-1008, the first component may be larger than the second component. Thus, a first portion of the displacement needed to move payload coupling apparatus 1000 to engage with the attachment point on payload 508 may be generated by UAV 500, and a second portion may be generated by fins 1002-1008. In performing these adjustments to the position of payload coupling apparatus 1000, the control system may account for the different delays between movements of UAV 500 and the transfer thereof to payload coupling apparatus 1000 as well as movements of fins 1002-1008 and the more-immediate generation of force thereby on the payload coupling apparatus 1000.

In some implementations, fins 1002-1008 may be passive, that is, unactuated. Fins 1002-1008 may be biased into the deployed or engaged configuration illustrated in FIG. 10 by one or more corresponding springs. When payload coupling apparatus 1000 is retracted into receptacle 514, fins 1002-1008 may be pushed into payload coupling apparatus 1000, against the bias provided by the springs, thus making fins 1002-1008 assume a stowed-away conformation. Similarly, when payload coupling apparatus 1000 snags on an object within the environment, fins 1002-1008 may be pushed into the stowed-away conformation as UAV 500 pulls on tether 502 to break the snag. Passive fins 1002-1008, when deployed, may operate to keep payload coupling apparatus centered underneath UAV 500 as a result of the downwash of air from UAV 500 flowing over fins 1002-1008. Further, fins 1002-1008 may create additional drag in the horizontal direction when payload coupling apparatus 1000 swings. Thus, fins 1002-1008 may operate to suppress oscillations of payload coupling apparatus 1000, thereby facilitating the process of guiding payload coupling apparatus 1000 to within the threshold distance of payload 508 and repositioning the payload coupling apparatus 1000 to mechanically couple payload 508.

Additionally, in some implementations, instead of using fins 1002-1008, payload coupling apparatus may be outfitted with one or more thrusters. For example, one steerable thruster may be reoriented with respect to payload coupling apparatus 1000 to control a direction in which the thruster pushes payload coupling apparatus 1000. Alternatively, multiple fixed thrusters, each pointed in a different direction, may be selectively activated to steer payload coupling apparatus 1000 as desired. Still further, a combination of fixed and steerable thrusters may be used. The thrusters may be implemented using rotors, propellers, pressurized fluid, or other propelling means.

In general, the repositioning operations described with respect to one implementation of the above-described repositioning devices may be used with all the other implementations. Further, the different repositioning devices may be combined and used together. For example, a payload coupling apparatus may include fins for controlling the payload coupling apparatus during descent and ascent as well as wheels for controlling the horizontal position of the payload coupling apparatus after it is deposited on the ground.

VIII. ADDITIONAL EXAMPLE OPERATIONS

Figure 12:
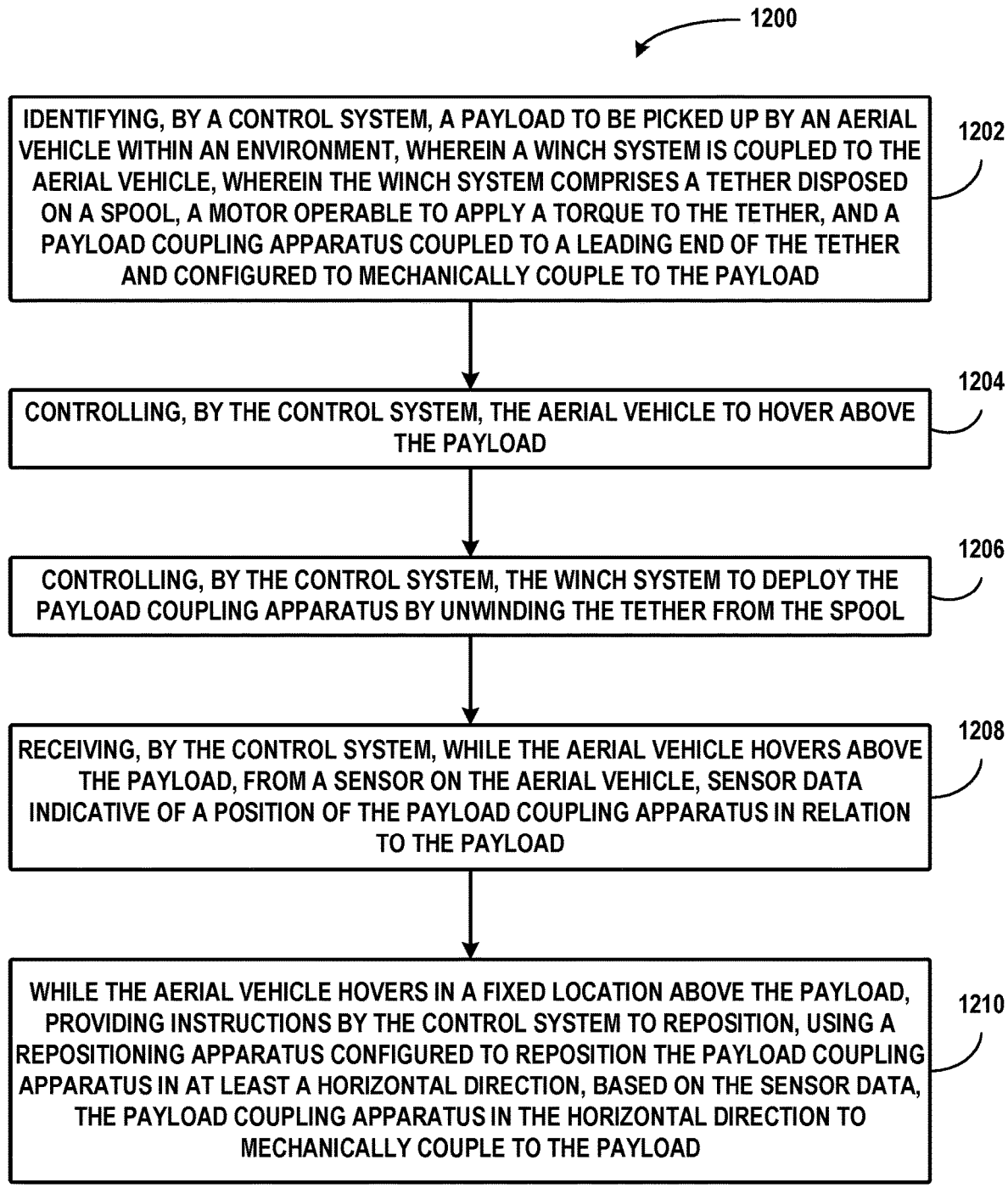
FIG. 12 illustrates a flow chart, in accordance with example embodiments.

FIG. 12 illustrates flowchart 1200 of example operations related to pickup of a payload by a UAV. These operations may be executed by UAVs 1A-1E, UAV 200, system 300, ATSP control system 401, UAV 500 or a control system thereof, and/or one or more other computing devices or systems.

Block 1202 may involve identifying, by a control system, a payload to be picked up by an aerial vehicle within an environment. A winch system may be coupled to the aerial vehicle. The winch system may comprise a tether disposed on a spool, a motor operable to apply a torque to the tether, and a payload coupling apparatus coupled to a leading end of the tether and configured to mechanically couple to the payload.

Block 1204 may involve controlling, by the control system, the aerial vehicle to hover above the payload.

Block 1206 may involve controlling, by the control system, the winch system to deploy the payload coupling apparatus by unwinding the tether from the spool.

Block 1208 may involve receiving, by the control system, while the aerial vehicle hovers above the payload, from a sensor on the aerial vehicle, sensor data indicative of a position of the payload coupling apparatus in relation to the payload.

Block 1210 may involve, while the aerial vehicle hovers in a fixed location above the payload, providing instructions by the control system to reposition, using a repositioning apparatus configured to reposition the payload coupling apparatus in at least a horizontal direction, based on the sensor data, the payload coupling apparatus in the horizontal direction to mechanically couple the payload to the tether using the payload coupling apparatus. The repositioning apparatus may be any one of or combination of the repositioning devices or apparatuses shown in and discussed with respect to FIGS. 6A-11B, or otherwise herein described.

In some embodiments, controlling the aerial vehicle to hover above the payload and controlling the winch system to deploy the payload coupling apparatus by: controlling the position of the aerial vehicle in coordination with the winch system to maneuver the payload coupling apparatus to within a threshold distance of the payload; and based on the payload coupling apparatus being maneuvered to within the threshold distance of the payload, causing the aerial vehicle to hover in a fixed location above the payload to maintain the payload coupling apparatus within the threshold distance of the payload.

In some embodiments, a trajectory may be determined for the payload coupling apparatus to follow to mechanically couple to the payload. The trajectory may be defined in at least the horizontal direction. An end of the trajectory may coincide with an attachment point for the payload coupling apparatus on the payload. The repositioning apparatus may be actuated to reposition the payload coupling apparatus according to the trajectory.

In some embodiments, oscillation of the payload coupling apparatus may be suppressed as the payload coupling apparatus approaches the end of the trajectory to reduce a difference between a position indicated by the trajectory and an actual position of the payload coupling apparatus.

In some embodiments, the trajectory may define an orientation of the payload coupling apparatus relative to the attachment point on the payload. The orientation of the payload coupling apparatus at the end of the trajectory may match an orientation of the attachment point on the payload to mate the payload coupling apparatus with the attachment point.

In some embodiments, the repositioning apparatus may include wheels coupled to the payload coupling apparatus and driven by additional corresponding motors. The aerial vehicle may be controlled to hover above the payload and the winch system may be controlled to deploy the payload coupling apparatus by controlling the position of the aerial vehicle in coordination with the winch system to deposit the payload coupling apparatus and the wheels thereof onto a surface in the environment near the payload.

In some embodiments, the payload coupling apparatus may be repositioned in the horizontal direction to mechanically couple to the payload by identifying, based on the sensor data, an attachment point on the payload to which to mechanically couple the payload coupling apparatus. The additional corresponding motors may be caused to drive the wheels over the surface and towards the attachment point to mechanically couple the payload using the payload coupling apparatus.

In some embodiments, the wheels may include two wheels. While the aerial vehicle hovers above the payload, the motor of the winch system may be controlled to maintain tension on the tether while the payload coupling apparatus is repositioned in the horizontal direction to maintain the payload coupling apparatus upright on the two wheels.

In some embodiments, the wheels may include two wheels. The payload coupling apparatus may include one or more gyroscopes coupled thereto. Data indicative of a tilt of the payload coupling apparatus may be received from the one or more gyroscopes. Based on the data indicative of the tilt of the payload coupling apparatus, one or more of the additional corresponding motors may be actuated to maintain the payload coupling apparatus upright on the two wheels.

In some embodiments, the repositioning apparatus may include a plurality of adjustable aerodynamic features on the payload coupling apparatus. The payload coupling apparatus may be repositioned in the horizontal direction by adjusting the adjustable aerodynamic features on the payload coupling apparatus to generate on the payload coupling apparatus, using a downwash of air generated by the aerial vehicle while hovering above the payload, a force to reposition the payload coupling apparatus in the horizontal direction.

In some embodiments, the payload coupling apparatus may include thereon a plurality of passive aerodynamic features configured to dampen oscillations of the payload coupling apparatus using a downwash of air generated by the aerial vehicle while hovering above the payload.

In some embodiments, the repositioning apparatus may include one or more thrusters on the payload coupling apparatus configured to push the payload coupling apparatus in one or more directions. The payload coupling apparatus may be repositioned in the horizontal direction by actuating the one or more thrusters to reposition the payload coupling apparatus in the horizontal direction.

In some embodiments, the repositioning apparatus may include an actuated arm connected at a first end thereof to the aerial vehicle. The actuated arm may include at a second end thereof a tether guide through which the tether extends. The payload coupling apparatus may be repositioned in the horizontal direction by actuating the actuated arm to push the tether and the payload coupling apparatus in the horizontal direction.

In some embodiments, an arm may be connected at a first end thereof to the aerial vehicle. The arm may include at a second end thereof a tether guide through which the tether extends. The arm may be configured to dampen oscillations of the payload coupling apparatus while the aerial vehicle hovers in a fixed location above the payload.

In some embodiments, the sensor may be disposed on the payload coupling apparatus and coupled to the aerial vehicle by way of the winch system.

In some embodiments, the aerial vehicle may be controlled to hover above the payload and the winch system may be controlled to deploy the payload coupling apparatus by determining, based on the sensor data, synchronized adjustments to (i) a vertical position of the aerial vehicle, (ii) a horizontal position of the aerial vehicle, and (iii) an extent to which the tether is unwound from the spool. A position of the aerial vehicle may be adjusted in coordination with the winch system to perform the synchronized adjustments.

In some embodiments, a delay between adjustments in a position of the aerial vehicle and corresponding changes in a position of the payload coupling apparatus may be determined based on a length by which the tether has been unwound from the spool. The position of the aerial vehicle may be adjusted in coordination with the winch system based on the determined delay.

In some embodiments, after mechanically coupling to the payload, the aerial vehicle may be controlled in coordination with the winch system to pick up the payload.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A system comprising:
    an aerial vehicle;
    a sensor coupled to the aerial vehicle;
    a winch system coupled to the aerial vehicle, wherein the winch system comprises a tether disposed on a spool, a motor operable to apply a torque to the tether, and a payload coupling apparatus coupled to a leading end of the tether and configured to couple to a payload;
    a repositioning apparatus configured to reposition the payload coupling apparatus in at least a horizontal direction; and
    a control system comprising a processor and a non-transitory computer readable medium having stored thereon instructions that, when executed by the processor, cause the processor to perform operations comprising:
        identifying the payload to be picked up by the aerial vehicle within an environment;
        controlling the winch system to deploy the payload coupling apparatus by unwinding the tether from the spool;
        controlling a position of the aerial vehicle to: (i) maneuver the payload coupling apparatus to within a threshold horizontal distance of the payload and (ii) attempt to hover in a fixed location above the payload to maintain the payload coupling apparatus within the threshold horizontal distance of the payload; and
        while the aerial vehicle attempts to hover in the fixed location above the payload:
            (i) receiving, from the sensor, sensor data indicative of a position of the payload coupling apparatus in relation to the payload and (ii) repositioning, using the repositioning apparatus and based on the sensor data, the payload coupling apparatus in the horizontal direction and relative to the aerial vehicle to couple to the payload.

2. The system of claim 1, wherein the repositioning apparatus is configured to reposition the payload coupling apparatus by at least the threshold horizontal distance to couple to the payload.

3. The system of claim 1, wherein the threshold horizontal distance is based on a type of the repositioning apparatus.

4. The system of claim 1, wherein the operations further comprise:
    while the aerial vehicle attempts to hover in the fixed location above the payload, determining a deviation of the aerial vehicle from the fixed location; and
    repositioning, using the repositioning apparatus, the payload coupling apparatus to compensate for the deviation of the aerial vehicle from the fixed location.

5. The system of claim 1, wherein repositioning the payload coupling apparatus in the horizontal direction to couple to the payload comprises:
    determining, based on the sensor data, a trajectory for the payload coupling apparatus to follow to couple to the payload, wherein the trajectory is defined in at least the horizontal direction, and wherein an end of the trajectory coincides with an attachment point for the payload coupling apparatus on the payload; and
    actuating the repositioning apparatus to reposition the payload coupling apparatus according to the trajectory.

6. The system of claim 5, wherein the trajectory defines an orientation of the payload coupling apparatus relative to the attachment point on the payload, and wherein the orientation of the payload coupling apparatus at the end of the trajectory matches an orientation of the attachment point on the payload to mate the payload coupling apparatus with the attachment point.

7. The system of claim 1, wherein the repositioning apparatus comprises an actuated arm connected at a first end thereof to the aerial vehicle, wherein the actuated arm comprises at a second end thereof a tether guide configured to exert a force on the tether, and wherein repositioning the payload coupling apparatus in the horizontal direction comprises:
    actuating the actuated arm to push the tether and the payload coupling apparatus in the horizontal direction.

8. The system of claim 1, wherein the repositioning apparatus comprises one or more of: (i) wheels coupled to the payload coupling apparatus and driven by one or more additional motors, (ii) a plurality of adjustable aerodynamic features on the payload coupling apparatus configured to generate a force on the payload coupling apparatus using a downwash of air generated by the aerial vehicle, or (iii) one or more thrusters on the payload coupling apparatus configured to push the payload coupling apparatus in one or more directions.

9. The system of claim 1, wherein the repositioning apparatus comprises an arm connected at a first end thereof to the aerial vehicle, wherein the arm comprises at a second end thereof a tether guide configured to exert a force on the tether, and wherein the arm is further configured to dampen oscillations of the payload coupling apparatus while the aerial vehicle attempts to hover in the fixed location above the payload.

10. The system of claim 1, wherein controlling the position of the aerial vehicle to:

(i) maneuver the payload coupling apparatus to within a threshold horizontal distance of the payload comprises:
determining synchronized adjustments to (i) a vertical position of the aerial vehicle, (ii) a horizontal position of the aerial vehicle, and (iii) an extent to which the tether is unwound from the spool; and
adjusting a position of the aerial vehicle in coordination with the winch system to perform the synchronized adjustments.

11. The system of claim 1, wherein the payload coupling apparatus includes thereon a plurality of passive aerodynamic features configured to dampen oscillations of the payload coupling apparatus using a downwash of air generated by the aerial vehicle while hovering above the payload.

12. The system of claim 1, wherein the operations further comprise:
after coupling to the payload, controlling the aerial vehicle in coordination with the winch system to pick up the payload.

13. A computer-implemented method comprising:
identifying a payload to be picked up by an aerial vehicle within an environment, wherein a winch system is coupled to the aerial vehicle, wherein the winch system comprises a tether disposed on a spool, a motor operable to apply a torque to the tether, and a payload coupling apparatus coupled to a leading end of the tether and configured to couple to the payload;
controlling the winch system to deploy the payload coupling apparatus by unwinding the tether from the spool;
controlling a position of the aerial vehicle to: (i) maneuver the payload coupling apparatus to within a threshold horizontal distance of the payload and (ii) attempt to hover in a fixed location above the payload to maintain the payload coupling apparatus within the threshold horizontal distance of the payload; and
while the aerial vehicle attempts to hover in the fixed location above the payload: (i) receiving, from a sensor on the aerial vehicle, sensor data indicative of a position of the payload coupling apparatus in relation to the payload and (ii) repositioning, based on the sensor data and using a repositioning apparatus configured to reposition the payload coupling apparatus in at least a horizontal direction, the payload coupling apparatus in the horizontal direction and relative to the aerial vehicle to couple to the payload.

14. The computer-implemented method of claim 13, wherein the repositioning apparatus is configured to reposition the payload coupling apparatus by at least the threshold horizontal distance to couple to the payload.

15. The computer-implemented method of claim 13, wherein the threshold horizontal distance is based on a type of the repositioning apparatus.

16. The computer-implemented method of claim 13, wherein the repositioning apparatus comprises an actuated arm connected at a first end thereof to the aerial vehicle, wherein the actuated arm comprises at a second end thereof a tether guide configured to exert a force on the tether, and wherein repositioning the payload coupling apparatus in the horizontal direction comprises:
actuating the actuated arm to push the tether and the payload coupling apparatus in the horizontal direction.

17. The computer-implemented method of claim 13, wherein repositioning the payload coupling apparatus in the horizontal direction to couple to the payload comprises:
determining, based on the sensor data, a trajectory for the payload coupling apparatus to follow to couple to the payload, wherein the trajectory is defined in at least the horizontal direction, and wherein an end of the trajectory coincides with an attachment point for the payload coupling apparatus on the payload; and
actuating the repositioning apparatus to reposition the payload coupling apparatus according to the trajectory.

18. A non-transitory computer-readable storage medium having stored thereon instructions that, when executed by a computing device, cause the computing device to perform operations comprising:
identifying a payload to be picked up by an aerial vehicle within an environment, wherein a winch system is coupled to the aerial vehicle, wherein the winch system comprises a tether disposed on a spool, a motor operable to apply a torque to the tether, and a payload coupling apparatus coupled to a leading end of the tether and configured to couple to the payload;
controlling the winch system to deploy the payload coupling apparatus by unwinding the tether from the spool;
controlling a position of the aerial vehicle to: (i) maneuver the payload coupling apparatus to within a threshold horizontal distance of the payload and (ii) attempt to hover in a fixed location above the payload to maintain the payload coupling apparatus within the threshold horizontal distance of the payload; and
while the aerial vehicle attempts to hover in the fixed location above the payload: (i) receiving, from a sensor on the aerial vehicle, sensor data indicative of a position of the payload coupling apparatus in relation to the payload and (ii) repositioning, based on the sensor data and using a repositioning apparatus configured to reposition the payload coupling apparatus in at least a horizontal direction, the payload coupling apparatus in the horizontal direction and relative to the aerial vehicle to couple to the payload.

19. The non-transitory computer-readable storage medium of claim 18, wherein the repositioning apparatus is configured to reposition the payload coupling apparatus by at least the threshold horizontal distance to couple to the payload.

20. The non-transitory computer-readable storage medium of claim 18, wherein the threshold horizontal distance is based on a type of the repositioning apparatus.

\* \* \* \* \*